US010809056B2

(12) United States Patent
Barlev et al.

(10) Patent No.: US 10,809,056 B2
(45) Date of Patent: Oct. 20, 2020

(54) STRUCTURED LIGHT PROJECTOR

(71) Applicant: Ramot at Tel-Aviv University Ltd., Tel Aviv (IL)

(72) Inventors: Omri Barlev, Tel Aviv (IL); Michael Golub, Rehovot (IL)

(73) Assignee: RAMOT AT TEL-AVIV UNIVERSITY LTD, Tel Aviv (IL)

(*) Notice: Subject to any disclaimer, the term of this patent is extended or adjusted under 35 U.S.C. 154(b) by 56 days.

(21) Appl. No.: 16/275,479

(22) Filed: Feb. 14, 2019

(65) Prior Publication Data

US 2019/0249984 A1 Aug. 15, 2019

Related U.S. Application Data

(63) Continuation-in-part of application No. PCT/IL2017/050908, filed on Aug. 17, 2017.
(Continued)

(51) Int. Cl.
*G03B 21/20* (2006.01)
*G01B 11/25* (2006.01)
(Continued)

(52) U.S. Cl.
CPC .......... *G01B 11/2513* (2013.01); *G01B 11/25* (2013.01); *G02B 27/0927* (2013.01);
(Continued)

(58) Field of Classification Search
CPC ............... G03B 21/147; G03B 21/208; G03B 21/2033; G02B 27/425; G02B 27/0927;
(Continued)

(56) References Cited

U.S. PATENT DOCUMENTS 7,593,150 B2  9/2009 Masuda
2004/0051976 A1 3/2004 Karin et al.
(Continued)

FOREIGN PATENT DOCUMENTS

CN 1955720 A 5/2007
CN 102326169 A 1/2012
(Continued)

OTHER PUBLICATIONS

O. Barlev et al., "Resonance domain surface relief diffractive lens for the visible spectral region," Appl. Opt. 52, 1531-1540 (2013).
(Continued)

*Primary Examiner* — Sultan Chowdhury
(74) *Attorney, Agent, or Firm* — Browdy and Neimark, PLLC

(57) ABSTRACT

Devices and methods for 3D sensing are provided. The device comprising an optical device configured and operable to produce at least one structured light pattern, the optical device comprising a light source unit configured and operable to generate one or more light beams along predetermined one or more optical paths, and a diffractive optical unit accommodated in said one or more optical paths, at the output of said light source unit such that the diffractive optical unit faces the light source unit, the diffractive optical unit being non-periodic and two-dimensional and comprising at least one resonance-domain diffractive optical element configured to create 2D spatially variable pattern in a predetermined operative wavelength range, the diffractive optical unit being thereby configured and operable as a beam shaper for said one or more light beams to thereby create said at least one structured light pattern.

20 Claims, 28 Drawing Sheets

Related U.S. Application Data

(60) Provisional application No. 62/376,727, filed on Aug. 18, 2016.

(51) Int. Cl.
 *G02B 27/09* (2006.01)
 *G02B 27/42* (2006.01)
 *G06T 7/55* (2017.01)

(52) U.S. Cl.
 CPC ....... *G02B 27/0944* (2013.01); *G02B 27/425* (2013.01); *G03B 21/2033* (2013.01); *G06T 7/55* (2017.01)

(58) Field of Classification Search
 CPC ............ G02B 27/0933; G02B 27/0938; G02B 27/0944; G01B 11/25; G01B 11/254; G01B 11/2513; G01B 11/2518; G01B 11/2527; G01B 11/2531; G01B 11/2536
 See application file for complete search history.

(56) References Cited

U.S. PATENT DOCUMENTS

| | | | |
|---|---|---|---|
| 2007/0091302 A1 | 4/2007 | Harding et al. | |
| 2009/0009838 A1 | 1/2009 | Masuda | |
| 2011/0098896 A1 | 4/2011 | Kato et al. | |
| 2015/0285682 A1* | 10/2015 | Popovich | G02F 1/225 250/349 |
| 2016/0223828 A1 | 8/2016 | Abraham et al. | |
| 2016/0286202 A1 | 9/2016 | Romano et al. | |
| 2017/0277028 A1* | 9/2017 | Short | G03B 21/20 |

FOREIGN PATENT DOCUMENTS

| | | |
|---|---|---|
| CN | 105659106 A | 6/2016 |
| WO | 2009153446 A2 | 12/2009 |
| WO | 2013127974 A1 | 9/2013 |
| WO | 2015/059705 A1 | 4/2015 |
| WO | 2015059705 A1 | 4/2015 |

OTHER PUBLICATIONS

M. Golub, "Design of dense transmission diffraction gratings for high efficiency," J. Opt. Soc. Am. 32, 108-123 (2015).

O. Barlev et al., "Design and experimental investigation of highly efficient resonance domain diffraction gratings in the risible spectral region," Appl. Opt. 51, 8074-8080 (2012).

O. Barlev et al., "Chromatic dispersion of high-efficiency resonance domain diffractive lens," Appl. Opt. 54, 6098-6102 (2015).

O. Barlev et al., " Coherent imaging with a resonance domain diffractive lens in laser light," Appl. Opt. 55, 4820-4826 (2015).

O. Barlev et al., "High Resolution Compact Spectrometer Based on a Resonance Domain Diffractive Lens," IEEE Ph. Tech. Lett 28, 577-580 (2016).

Jason Geng, "Structured-light 3D surface imaging: a tutorial" Adv. Opt. Phtt. 3, 128-160 2011.

J. Salvi et al., "Pattern codification strategies in structured light systems", Pattern Recognition, 37, 827-849 (Apr. 2004).

Golub, et al., Characterization of resonance domain diffractive optical elements, Proceedings of SPIE, 2005, pp. 1-10, vol. 5965.

Lightbody, et al., Design of novel resonance domain diffractive optical elements, Proceedings of SPIE, 1995, pp. 96-107, vol. 2404.

Joseph N. Mait, Understanding diffractive optic design in the scalar domain, J. Opt. Sco. Am., Oct. 1995, pp. 2145-2158, vol. 12, No. 10.

* cited by examiner

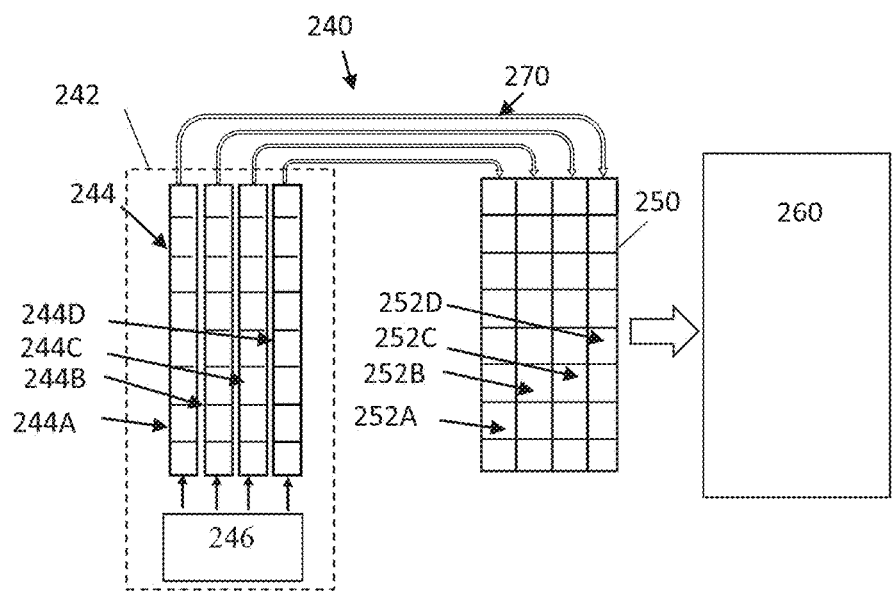
Fig. 2A
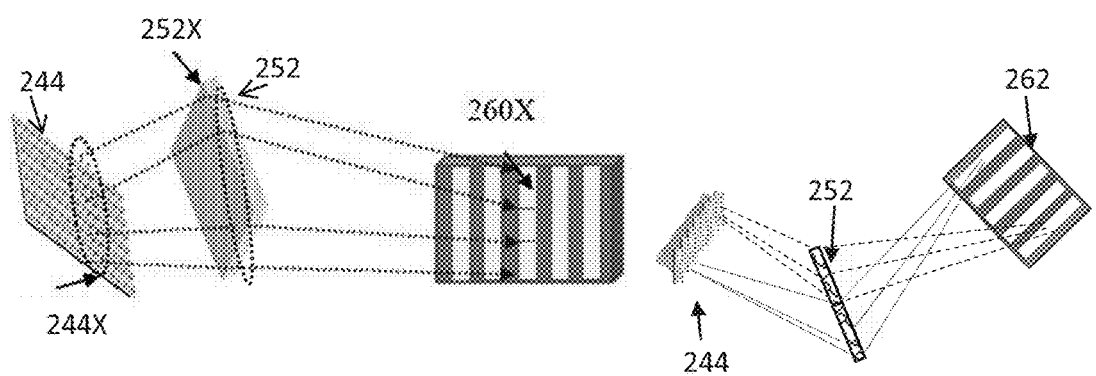
Fig. 2B
Fig. 2C

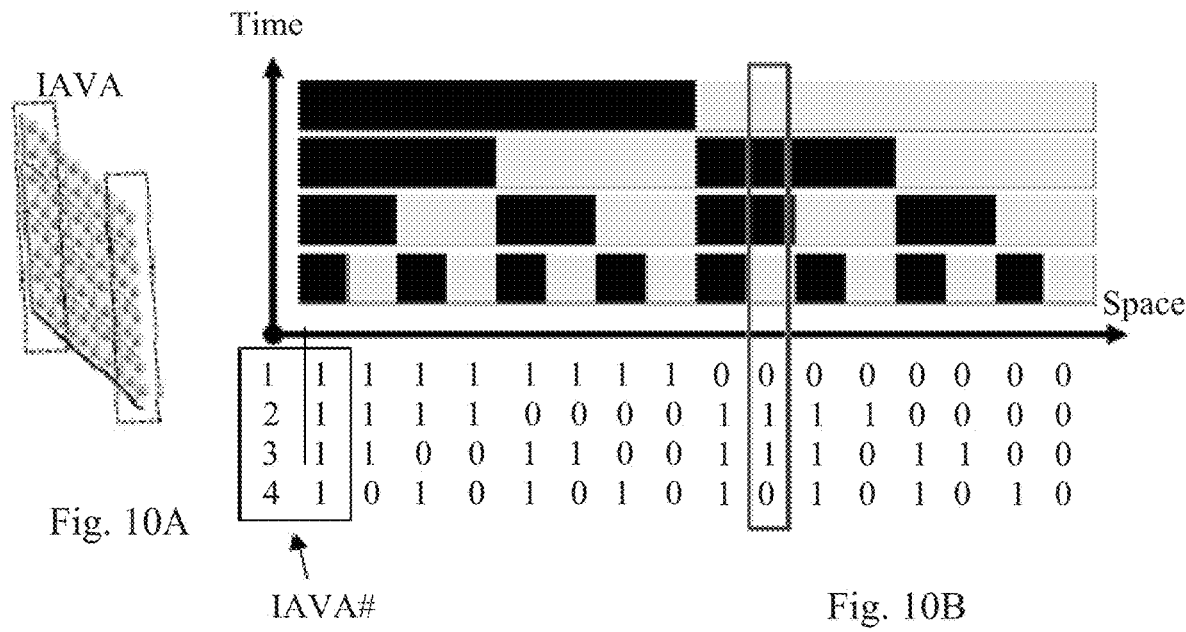
Fig. 10A
Fig. 10B
IAVA#
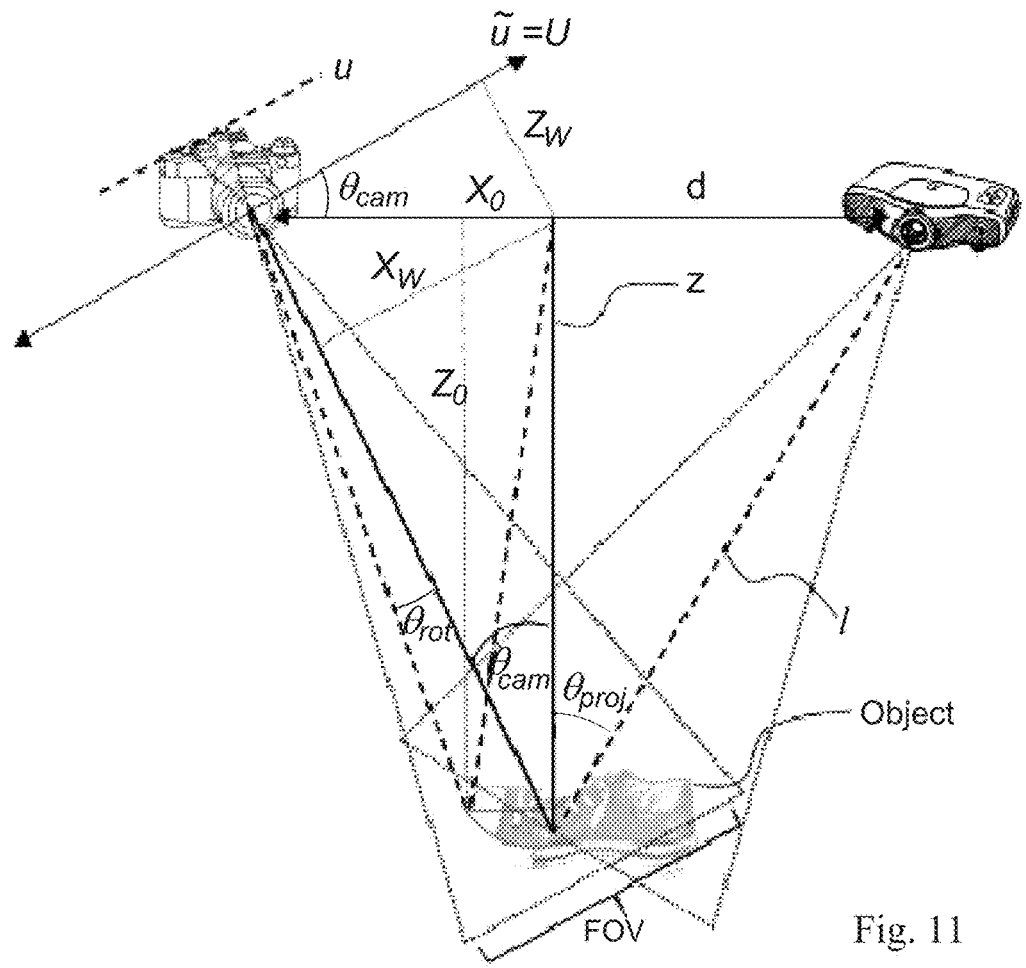
Fig. 11

Fig. 12A

| DOE diameter [mm] | Working distance - Z [meters] | Diffraction limit $\Delta_{limit}$ [mm] | Depth of field [m] | Top hat width 2a [mm] | Top hat height 2b [mm] | Pixel size on image [mm] | Projector magnification $M^2_{proj}$ | Top hat power density [W/m^2] vs camera exposure [μs] | | |
|---|---|---|---|---|---|---|---|---|---|---|
| | | | | | | | | 0.2μs | 0.5μs | Avg. |
| 3 | 1 | 0.35 | 0.38 | 1.73 | 371 | 0.14 | 46 | 6669 | 2668 | 1334 |
| | 5 | 1.73 | 9 | 8.64 | 1853 | 0.69 | 230 | 267 | 107 | 53 |
| | 10 | 3.46 | 37 | 17.28 | 3707 | 1.39 | 459 | 67 | 27 | 13 |
| | 20 | 6.91 | 151 | 34.57 | 7414 | 2.78 | 918 | 17 | 7 | 3 |
| 20 | 1 | 0.05 | 8.5 mm | 0.26 | 371 | 0.14 | 18 | 44462 | 17785 | 8892 |
| | 5 | 0.26 | 0.21 | 1.30 | 1853 | 0.69 | 89 | 1778 | 711 | 356 |
| | 10 | 0.52 | 0.85 | 2.59 | 3707 | 1.39 | 178 | 445 | 178 | 89 |
| | 20 | 1.04 | 3.4 | 5.19 | 7414 | 2.78 | 356 | 111 | 44 | 22 |

| DOE diameter [mm] | Working distance - Z [meters] | Longitudinal resolution (depth) [mm, % to depth] | Lateral resolution (Texture) [mm, mrad] |
|---|---|---|---|
| 3 | 1 | 0.4 , 0.04% | 1.73 , 1.73 |
|  | 5 | 2 , 0.04% | 8.64 , 1.73 |
|  | 10 | 4 , 0.04% | 17.28 , 1.73 |
|  | 20 | 8 , 0.04% | 34.57 , 1.73 |
| 20 | 1 | 0.4 , 0.04% | 0.26 , 0.26 |
|  | 5 | 2 , 0.04% | 1.30 , 0.26 |
|  | 10 | 4 , 0.04% | 2.59 , 0.26 |
|  | 20 | 8 , 0.04% | 5.19 , 0.26 |

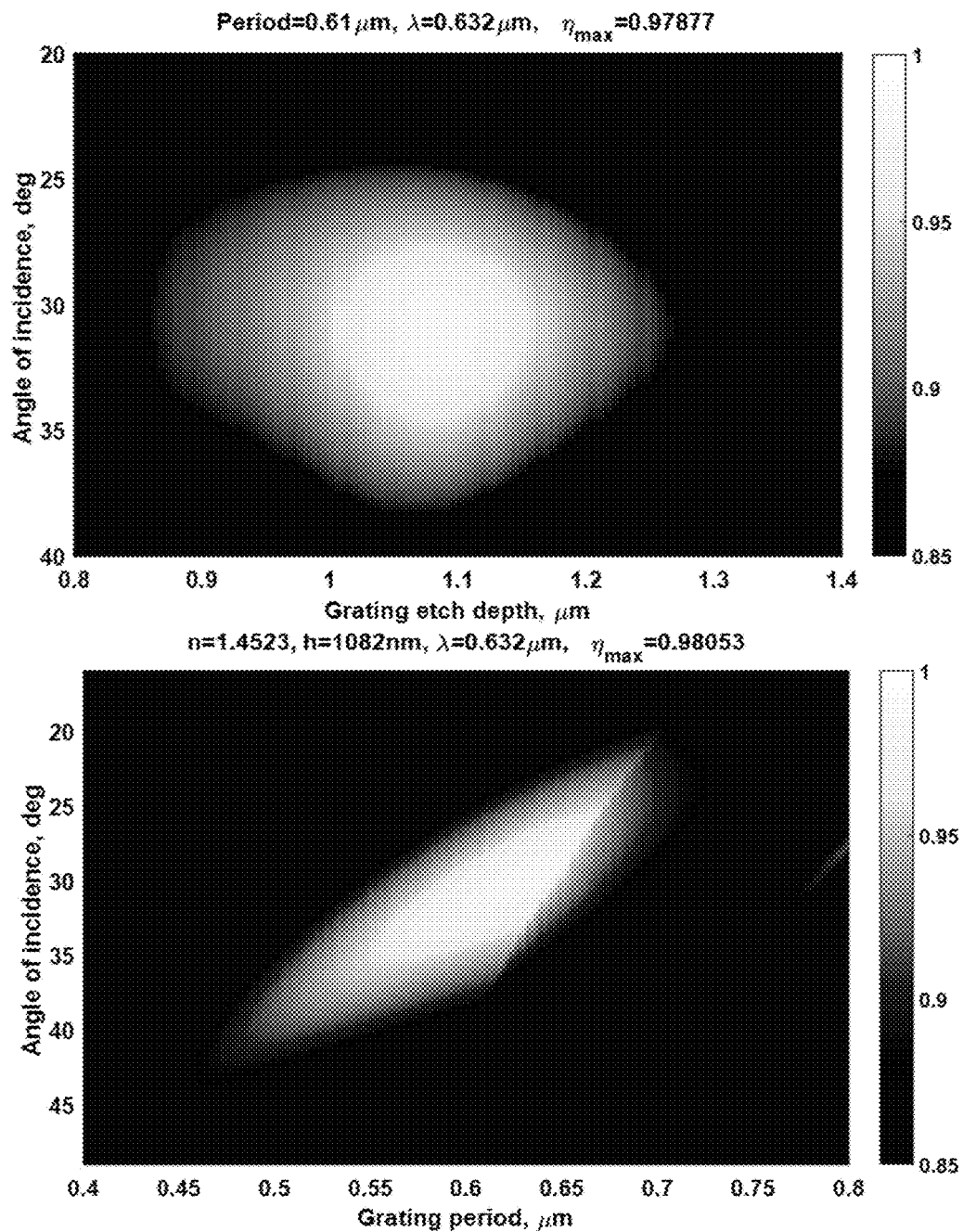
Fig. 14A1
Fig. 14A2

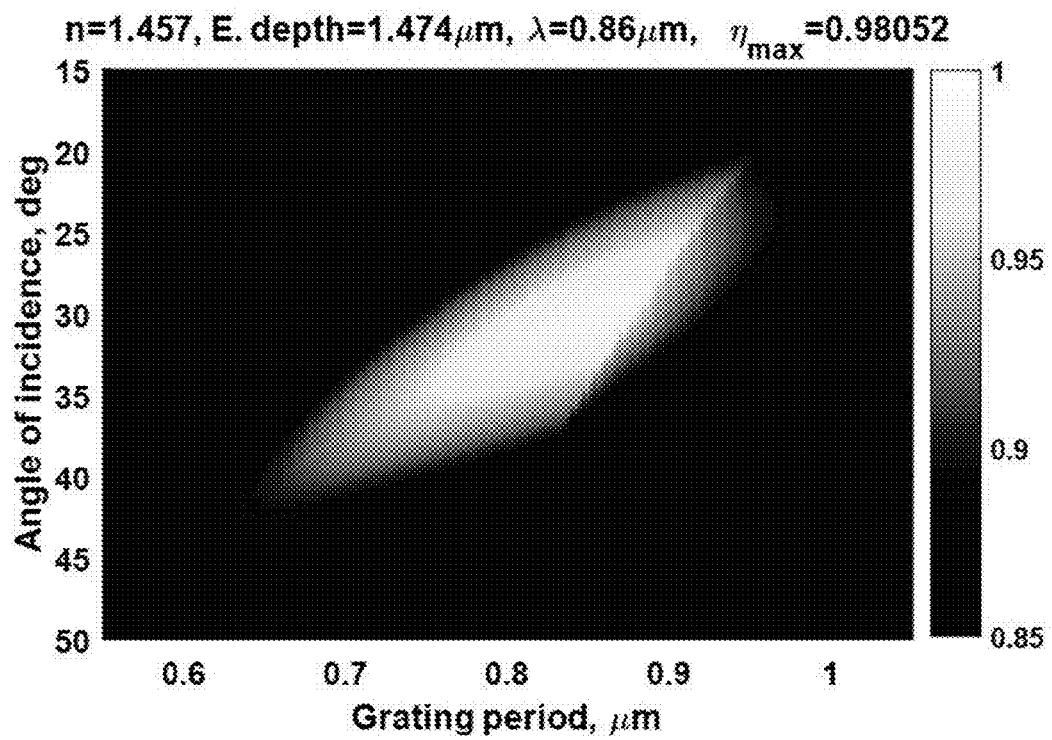
Fig. 14B1
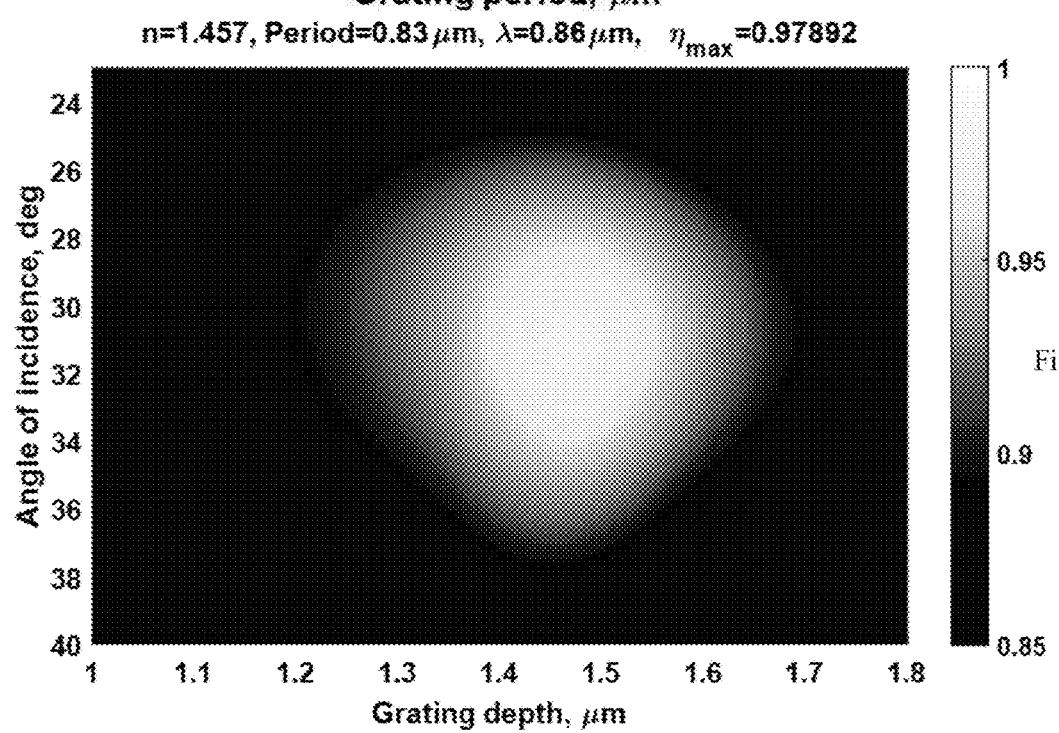
Fig. 14B2

— $I < \exp(-8)$

— $I > \exp(-8)$

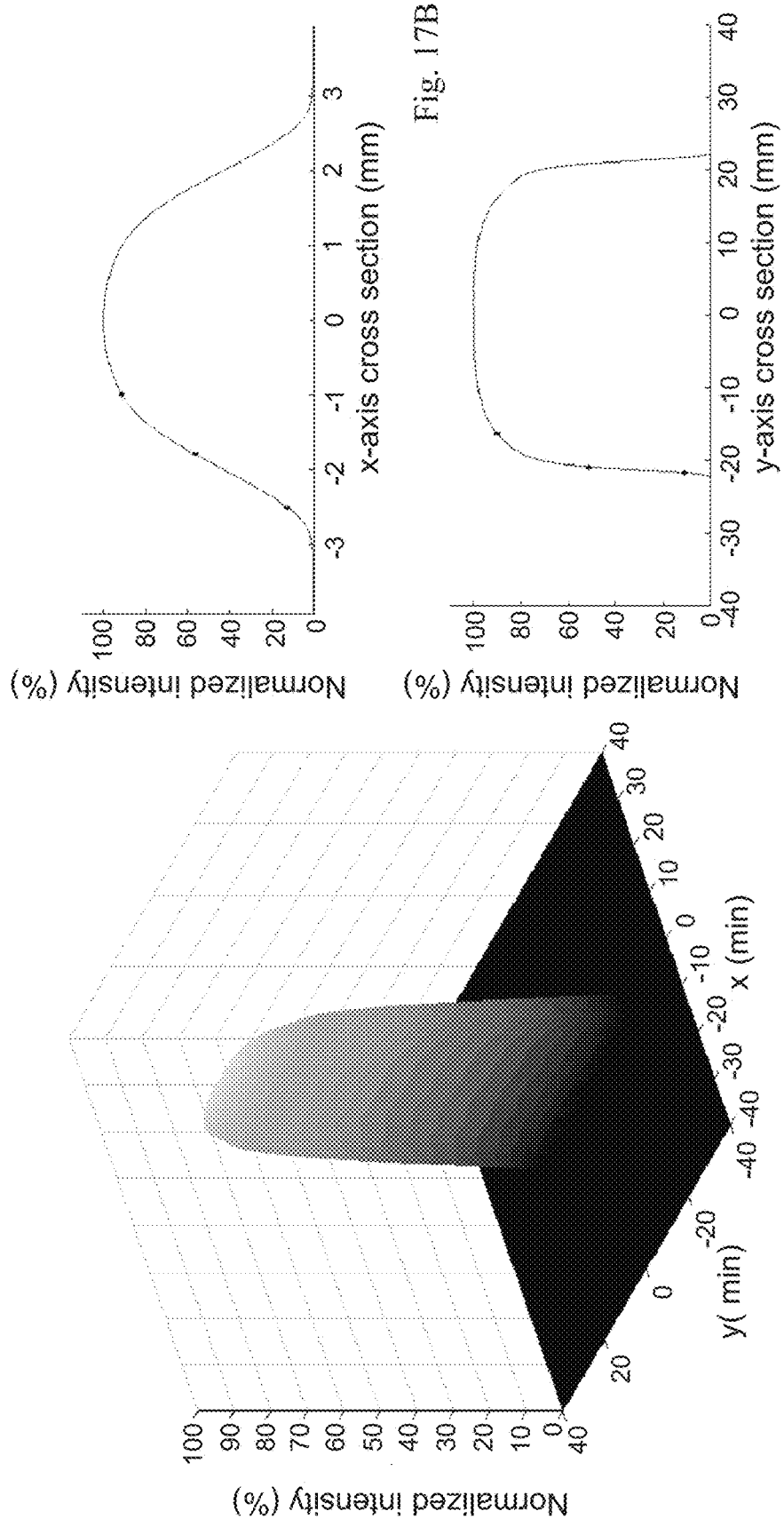

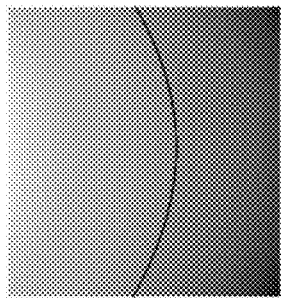 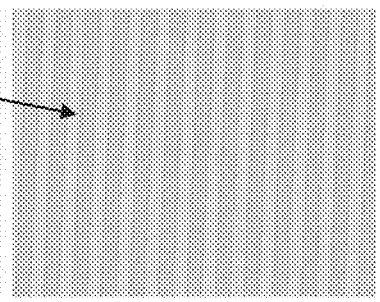
Fig. 19A  Fig. 19B  Fig. 19C
| Option # | 1 | 2 |
|---|---|---|
| Acceleration Voltage, kV | 50 | 100 |
| Beam current, nA (aperture, $\mu m$) | ~1 | 15 (200) |
| Beam spot, nm | ~2 | ~13 |
| Beam step size, nm | 1 | 10 |
| Optimal dosage, $\mu c/cm^2$ | 190 | 390 |
| Writing speed, $min/mm^2$ | ~30 | ~5 |
Fig. 20A

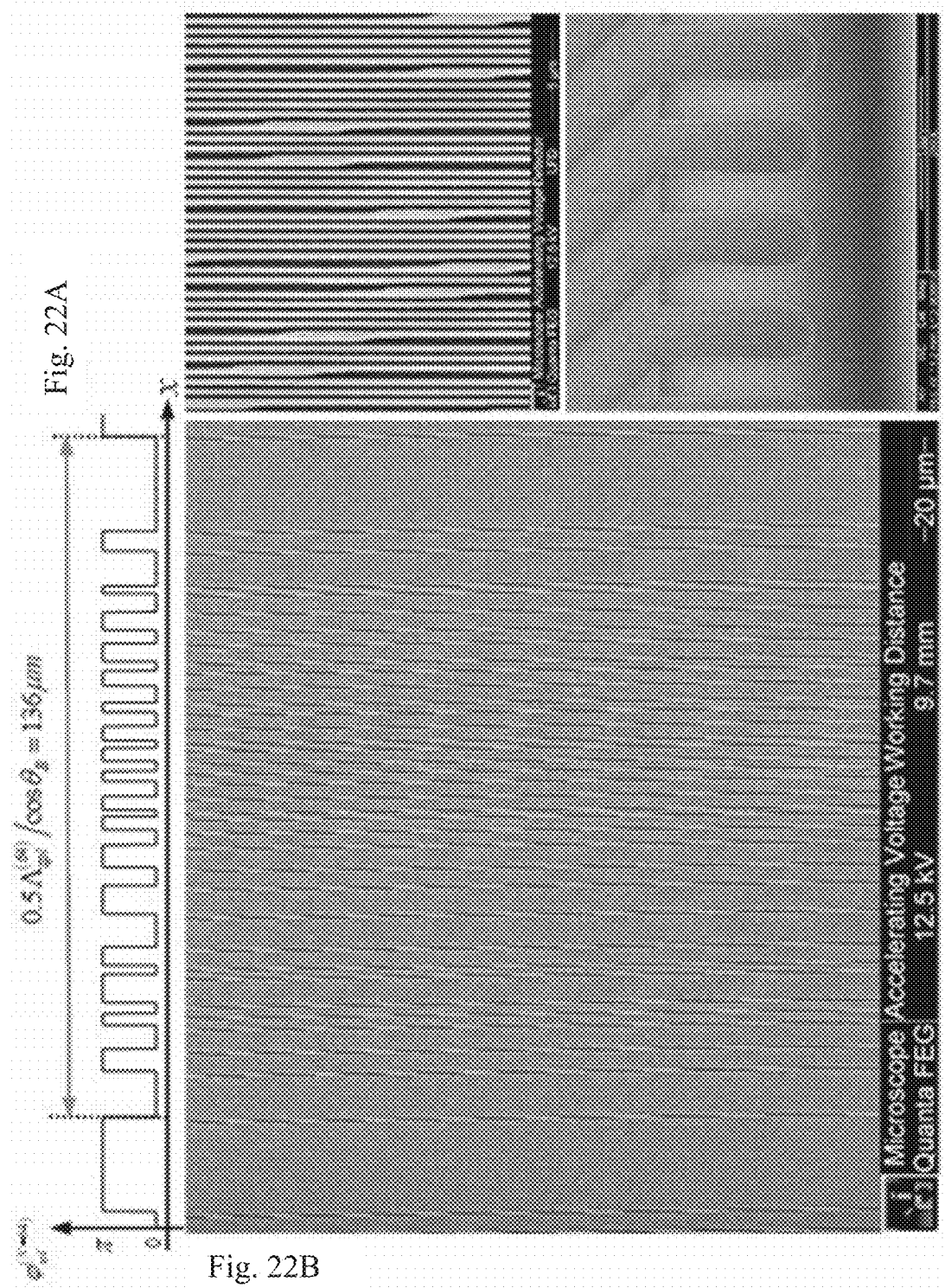

Fig. 28 A
Fig. 28 B
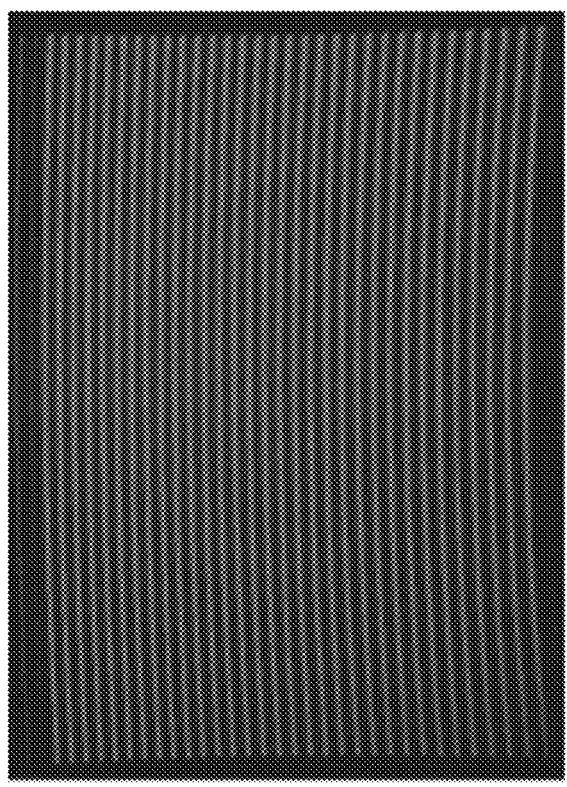
Fig. 28C  Fig. 28D  Fig. 28G  Fig. 28H
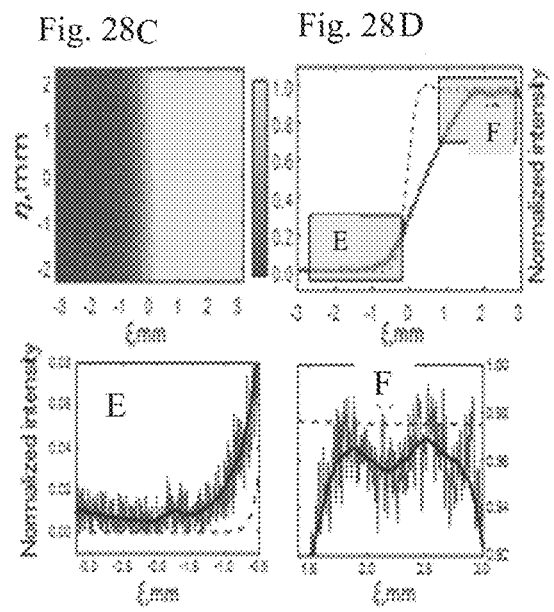
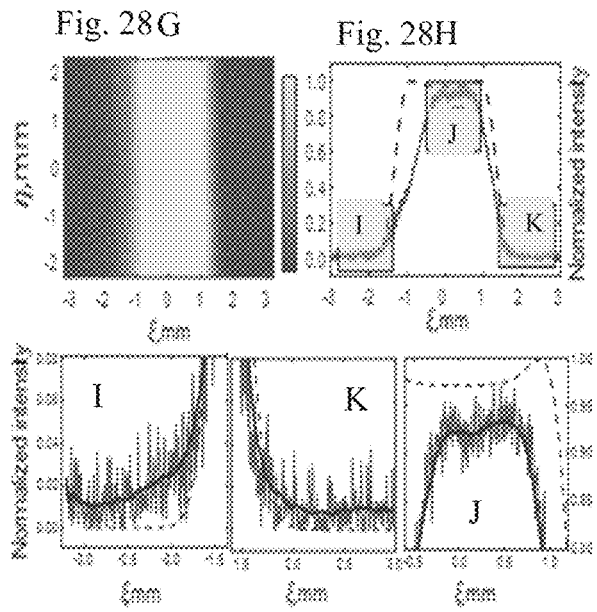
Fig. 28E  Fig. 28F  Fig. 28I  Fig. 28K  Fig. 28J

| DOE#. | N | $\eta_c^{(\Lambda)}$ | |
|---|---|---|---|
| | | Theoretical | Experimental |
| 1 | 1 | 0.91 | 0.88 |
| 2 | 1 | 0.95 | 0.81 |
| 3 | 2 | 0.78 | 0.68 |
| 4 | 4 | 0.67 | 0.67 |
| 5 | 8 | 0.73 | 0.72 |
| 6 | 16 | 0.78 | 0.76 |
| 7 | 32 | 0.80 | 0.72 |
| 8 | 64 | 0.77 | 0.73 |

Fig. 29

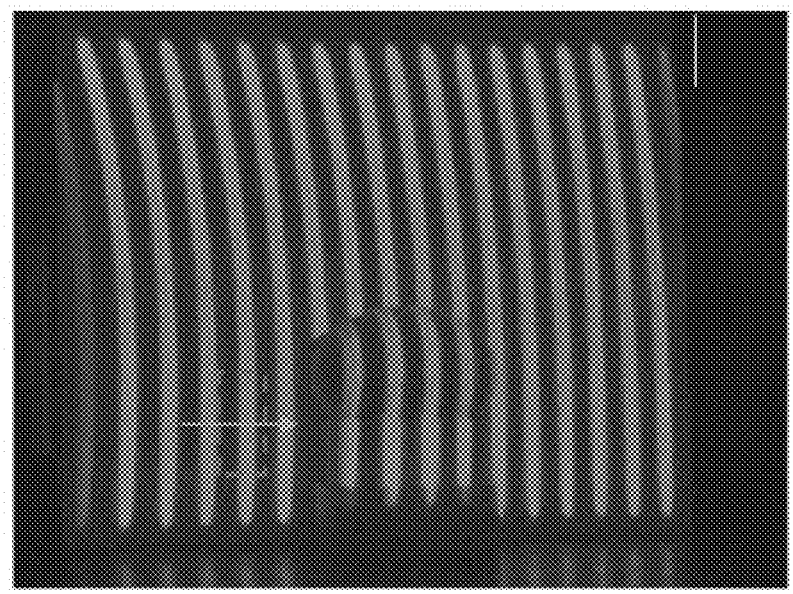
Fig. 33A
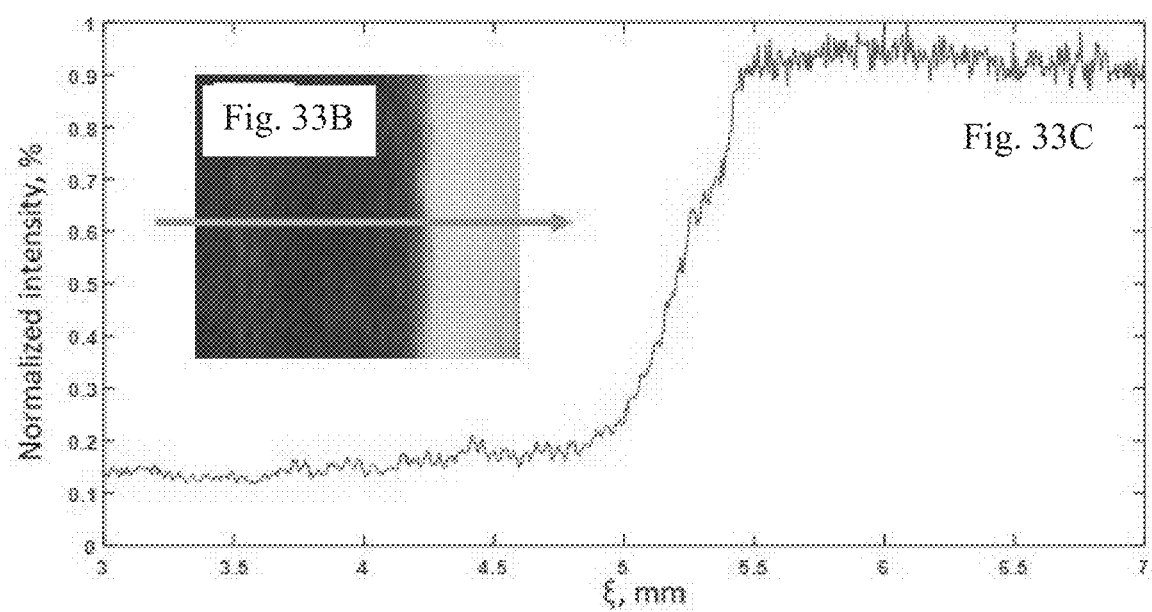
Fig. 33B
Fig. 33C

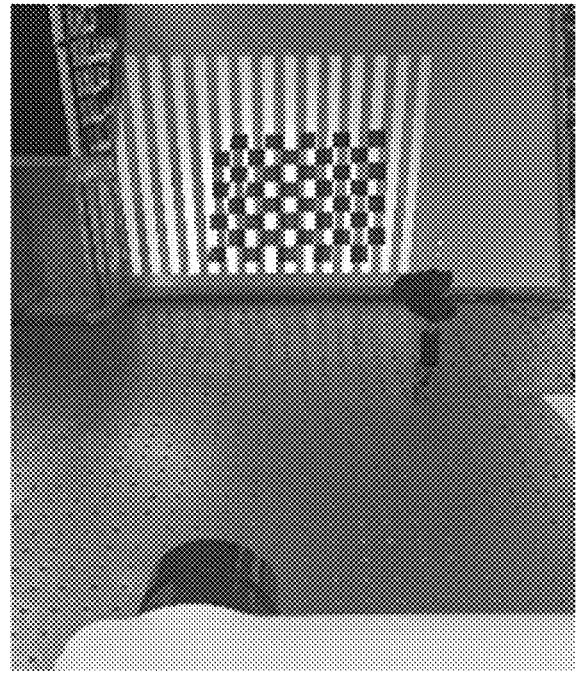
Fig. 35
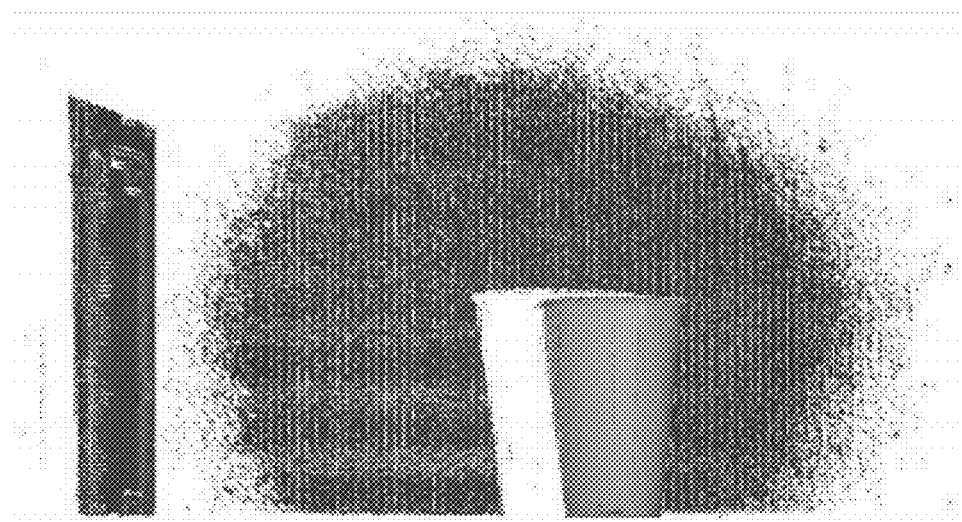
Fig. 36

STRUCTURED LIGHT PROJECTOR

TECHNOLOGICAL FIELD

The present invention is in the field of projectors and relates specifically to structured light illumination that can be used in three-dimensional scanning for sensing, imaging, three-dimensional printing and computer-integrated manufacturing (CIM).

BACKGROUND

Computed reconstruction of a three-dimensional (3D) object can be achieved by projecting a known pattern, such as vertical or horizontal bars or spots, either random or deterministic, on the object. As the bars deform or spots deviate when striking surfaces, vision systems can calculate the depth and surface information of the object. State of the art light projectors used in such reconstruction applications include spatial light modulators (SLM) such as DLP, LCD, and LCoS with incoherent LED or lamp light sources. These projectors are usually restricted to visible spectral region, have limited number of spatial pixels, have limited, high, etendue of the power flux and have low light efficiency due to multiple layers structure. The raster structure of the projectors imposes limitations on the state of the art light projectors to be used as a source for structured light for three-dimensional scanning Accordingly, power losses, acquisition time, frame rate, object size, contrast of projected Structured Light (SL) intensity patterns in the sun or other background light are compromised and consequently the resolution and the working distance range of the entire 3D scanning system is reduced.

WO 2013/127974 discloses a structured light projector, wherein a spatially coded structured light is generated by an array of laser diodes in order to perform structured light triangulation. The laser diodes are VCSEL, where the light is emitted in the direction perpendicular to the semiconductor wafer surface. Plural such laser diodes are integrated monolithically to form an array. The position of the individual laser diodes in the array is coded spatially to form a non-regular unique pattern. The light output by the lasers is projected by a refractive or diffractive optical system into the space to be monitored to form the structured light pattern. An object to be investigated may be illuminated by the VCSEL array and a camera captures the frames. A processing unit controls the power of VCSEL and processes the data from the camera.

WO 2015/059705 discloses an apparatus for generating a dynamic structured light pattern for optical tracking in three-dimensional space, the apparatus comprises an array of lasers, such as a VCSEL laser array, to project light in a pattern into a three-dimensional space; and an optical element or elements arranged in cells. The cells are aligned with subsets of the laser array, and each cell individually applies a modulation, in particular an intensity modulation, to light from the laser or lasers of the subset, to provide a distinguishable and separately controllable part of the dynamic structured light pattern.

GENERAL DESCRIPTION

The present invention provides a novel projector for creating structured light (SL) patterns. The projector of the present invention is highly efficient, e.g. in its use of light power, cost-effective and provides high resolution structured light patterns. The projector can be used, inter alia, in 3D imaging of far objects (e.g. 5 to 200 meters away) with high resolution, as well as for relatively wide objects from a close distance thanks to scan capability with large fan angles.

Visible and IR laser sources have high power, advantageous low etendue and ability to create diffraction-limited SL patterns, albeit they are incompatible with existing DLP, LCD, and LCoS in 3D scanning Projectors with microscanning mirrors and single high power laser, demand a challenging high frequency time scan of a 3D object and may have laser safety problems, especially in situation when the mirror rests and laser is still on.

Alternatively, static laser projectors of SL, like laser pointers or professional telecentric optical systems project a fixed, single, SL pattern and do not support projection of time-variable patterns with different SL patterns, and therefore are not applicable for high resolution 3D scanning with SL pattern set (a plurality of different SL patterns). Furthermore, these static projectors of a single SL pattern customarily use scalar domain diffractive optical elements (DOEs) with local period of tens of light wavelengths, which have severe restrictions in angular dimensions of the light pattern, fan angle, spatial resolution and light efficiency.

The novel projector device, disclosed herein, includes a static projector capable of scanning an object with a plurality of two-dimensional spatial patterns, for example a predetermined set of two-dimensional spatial patterns. The projector includes a structured light generator configured to controllably operate as a spatial light modulator that creates a restricted set of high resolution, high contrast and powerful spatial patterns of light, and preferably comprises a single light source or an array of static structured light sources (light emitter(s), or light output region(s) associated with an external emitter), such as laser(s) associated with static beam shaper(s) that spatially modulate the emitter(s).

Each light source produces a light beam and is electronically controlled/tuned, being switchable on and off. The array of light sources provides dynamic pattern projection by turning on and off selected static light source(s). The array of light sources is preferably constituted by array(s) of lasers, such as VCSELs. In some embodiments, a single light source is used being associated with its own/dedicated high-efficiency diffractive optical element (beam shaper). This enables production of a single SL pattern, or a plurality of different structured light patterns in case when the DOE includes different regions where each region is configured to produce a different unique SL pattern. In some embodiments, a plurality of light sources are used, each light source being associated with its own/dedicated high-efficiency diffractive optical element (beam shaper), such that a corresponding plurality of SL patterns can be produced per activation of source-DOE pairs. In some embodiments, each light source (whether a single light source or an array of light sources), is formed by a sub-array or group of lasers (e.g. VCSEL arrays) which is associated with its own/dedicated high-efficiency diffractive optical element (beam shaper). Thus, the projector includes a diffractive unit accommodated such that each laser or each sub-array/group of the lasers is associated (aligned) with a corresponding region of the diffractive optical element which acts as the beam shaper for said laser/sub-array or group of lasers. The patterns in said regions may or may not be different.

According to the invention, the diffractive unit consists of one or more DOEs resulting in corresponding one or more SL patterns. It is noted that, in some embodiments, the diffractive unit consists of a single DOE that is configured with a plurality of different patterned regions, thus being comparable to a configuration where a plurality of DOEs, each having one patterned region, are used to produce a plurality of SL patterns.

The DOE of the present invention is non-periodic, i.e. it has a spatially variable local period. The non-periodic nature of the DOE enables it to shape the light beam and function as a beam shaper. Therefore, the DOE is two-dimensional, having a two-dimensional structure of the grating, varying over its length and height dimensions. Being non-periodic, the DOE of the present invention does not require collimation of the beam light before passing through the DOE or focusing of the light beam after the DOE, enabling it to work directly with the light sources towards the object on which the SL pattern is generated. Accordingly, the DOE can be accommodated at the output of the light source, facing the light source, and consequently be the direct generator of the SL pattern on the object for which the SL pattern is produced. There is no (or no need to) intermediate conventional optical elements/arrangements between the light source(s) and the diffractive optical element(s) (DOE(s)), such that the light beam travels directly therebetween, nor is there (or a need to) an intermediate optical elements/arrangements between the DOE(s) and the object on which the SL pattern is generated.

The diffractive unit includes a resonance domain DOE (RDDOE). The RDDOE is configured with local period comparable to that of the laser wavelength. The RDDOE is usually arranged in an off-axis orientation with respect to the light source(s) orientation. It should be understood that if the RDDOE has different patterns in the different regions thereof, i.e. it is two-dimensional and non-periodic and features spatially variable periodicity, wherein all local diffractive patterns have periods comparable to that of the laser(s) wavelength being associated therewith. The laser wavelength and accordingly the RDDOE period(s) are selected in accordance with the specific application.

The inventors have found that diffraction efficiency and ability to withstand high light power densities of the resonance domain diffractive beam shaper in the range of 80%-100% supports increased distance range, while high numerical aperture (NA) supports increased resolution in 3D scanning and enables the large fan angles, such that large objects can be illuminated from a short distance.

Combination of dynamically controlled laser array(s) with the static resonance-domain DOE(s) brings together high power of light, high spatial fidelity, wide angular range, fast dynamics, compactness and cost efficiency to dynamic SL projectors for 3D scanning and other fields.

Thus, according to a first aspect of the invention, there is provided a projector comprising an optical device configured and operable as a structured light generator to produce at least one structured light pattern, the optical device comprising a light source unit configured and operable to generate one or more light beams along predetermined one or more optical paths, and a diffractive optical unit accommodated at the output of the light source unit, in said one or more optical paths, such that the diffractive optical unit is facing the light source unit, the diffractive optical unit being non-periodic and two-dimensional (2D) and comprising at least one resonance-domain diffractive optical element (RD-DOE) configured to create 2D spatially variable pattern in a predetermined operative wavelength range, the diffractive optical unit thereby being configured and operable as a beam shaper for said one or more light beams, to thereby create said at least one structured light pattern.

In accordance with some aspects of the invention, the use of a resonance domain DOE; set of several sub-arrays/ groups of lasers, e.g. VCSELs, with independent temporal electronic control for each of the lasers or sub-arrays (each such sub-array is sometimes called herein IAVA); and a different resonance domain DOE (or different regions of a single resonance domain DOE) for a different laser of a single array; provides the ability to create a time-series (time pattern) of structured light patterns, such that each structured light pattern includes sub-patterns and primitive shapes. In this connection, it should be understood that the terms of sub-array or group of lasers refer to multiple lasers being simultaneously activated thus forming a sub-pattern of the structured light pattern. Also, the term time pattern or time-series refers to successively produced different sub-patterns; and the term primitive shape (e.g. line(s) or rectangular shape(s) or spot(s)) refers to a light pattern resulting from activation of a single laser or a group of lasers operated together.

Each sub-pattern of the SL pattern is created by combined operation of the lasers of a single array.

To this end, in some embodiments, the projector comprises a control unit configured and operable to operate said optical device to successively perform multiple illumination sessions and produce a desired sequence of different structured light patterns, said control unit controls selection of one or more sets of one or more light sources in the light source unit to produce respective one or more of the light beams to create each of the different structured light patterns, and operates said selection of the sets of the light sources according to a predetermined time pattern to create said desired sequence of the different structured light patterns during a predetermined time interval.

Entire time-sequence of the SL patterns is decomposed to timeframes of a limited number of sub-patterns and primitive shapes, such that each primitive shape is created by a single resonance domain DOE or a plurality of resonance domain DOEs installed opposite to and facing a single laser in an off-axis orientation thereto. In more detail, each laser array (IAVA) contains several lasers with RDDOEs per laser. Each RDDOE creates primitive shape (e.g. part of long straight line of a spot). The RDDOEs altogether belonging to one IAVA create sub-patterns (e.g. full long straight line or a plurality/set of spots). Several IAVAs that are put on create one of the SL patterns. Putting on/off of entire set of the IAVAs in a proper predetermined temporal sequence yields entire time-sequence of the SL patterns.

Accordingly, the technique of the present invention advantageously provides at least the following features: scalability for high optical power based on array of lasers; narrow spectrum of the structured patterns created by the laser light, high optical power enables outdoor (in sunlight) mid-range 3D scanning of 5-200 meters; reduced temporal coherence and minimized speckle noise (due to superposition of light from several lasers); high, diffraction limited, spatial fidelity in the projected patterns; wide angular range for extension of the SL pattern; independent on and off switching of hundreds of separate line stripes for the projection of binary or gray level structured patterns onto a scanned scene; extremely fast dynamics (typical laser rise time of ~1 ns), and unprecedented low power losses with light projection efficiency of about 80%; and no projection lens.

Therefore, the technique of the invention enables projection of light to a large distance, the invention is capable of operating in bright sun light or other bright light (because of narrow spectral width of the patterns), reduces dissipated heat of the projector because of efficient use of laser power, and substantially saves in cost of the projector and final 3D scanner product.

The combination of standard VCSEL arrays with a high NA and efficient resonance domain DOEs that have two-dimensional and non-periodic grating configuration, according to the invention, enables to combine the high power with high spatial fidelity, fast dynamics, and cost efficiency in dynamic structured light projectors for 3D scanning and other fields. It delivers a compact dynamic projector capable of high sharpness, increased scanning speed, low heating, scalable light power and cost margins. Such projector can serve as a key block of a high resolution 3D scanner using SL triangulation and time multiplexing technique for outdoor and mid-range distances.

The 3D scanning fields of applications, using the invention, might be but are not restricted to the following: Outdoor scanning of building(s), parts of building or vehicles (digitization and 3D scanning of mechanical parts, cars, planes, buildings and terrain); Unmanned vehicles and systems that require low weight high resolution simultaneous 3D scanning abilities for investigating the environment; Additive manufacturing and 3D printing based on 3D scanners; Robotic manufacturing and systems with 3D scanners; Dimensional characterization, measurement and quality control of parts, automatic measurements in production; Law enforcement—crime scene investigation, accident, fingerprint scanning; and Face recognition.

In some embodiments, the control unit of the invention comprises an actuator utility connectable to an operating utility of the structured light generator to simultaneously activate generation of a respective set of the light beams for the illumination session such that the light beams produced by the structured light generator during the illumination session intersect with corresponding locations on the RDDOE resulting in a desired structure light pattern.

In some embodiments, each of the corresponding locations on the two-dimensional, non-periodic RDDOE creates a portion (sub-pattern) of each of the different structured light patterns, wherein each of the different structured light patterns is split in one of the following: parts by boundaries extending parallel to a horizontal axis, parts by boundaries extending parallel to a vertical axis, parts by boundaries extending in both the horizontal axis and vertical axis, or parts by straight boundaries extending in oblique directions, or parts by curved boundaries in a plane that is lateral to propagation directions of the light beams.

In some embodiments, each of the corresponding locations or regions on the RDDOE identically creates an entire structured light pattern, such that the desired structured light pattern at the projection plane is a superposition of several identical patterns created by a plurality of simultaneously activated locations or regions on the RDDOE. This way the RDDOE becomes almost insensitive to the tolerances of its lateral positioning relative to the optical axis of the projector.

In some embodiments, each of the different structured light patterns have a different arrangement of features of the patterns.

In some embodiments, the control unit comprises an analyzer utility configured and operable to control a number of the illumination sessions being performed to create said sequence of the desired structured light patterns.

In some embodiments, the different structured light patterns have different spatial frequencies of the features of the patterns.

In some embodiments, the structured light pattern comprises an array of spaced-apart light stripes.

In some embodiments, the structured light pattern comprises an array of spaced-apart light spots, arranged randomly or deterministically.

In some embodiments, the RDDOE has an array of patterned regions, each such array of patterned regions being optically aligned with a respective sub-array of an array of light sources of the structured light generator.

In some embodiments, the structured light pattern produced by a pair of the optically aligned light source and the patterned region of the RDDOE has a rectangular shape.

In some embodiments, the optical unit is configured to produce the structured light pattern having a fan angle of light projection onto a projection surface, where the object is located, the fan angle being larger than 20 degrees.

In some embodiments, the at least one spatial frequency of the spatial patterns is at least 3 cycles per degree.

According to yet another aspect of the invention, there is provided a method for use in 3D imaging of an object, the method comprising: projecting two-dimensional (2D) spatially varying structured light patterns comprising sub-patterns and primitive shapes onto the object, capturing by a digital camera a 2D image(s) of the object while illuminated by the structured light patterns, digitally analyzing of geometrical distortion of each of the structured light patterns, and providing image data indicative of the object, wherein said projecting comprises a sequence of projections including projections of different structured light patterns successively projected onto the object according to a predetermined time pattern, said image data thereby comprising a sequence of image data pieces including the data pieces corresponding to the different structured light patterns, thereby enabling processing of said image data to reconstruct a 3D image of the object.

In some embodiments, number of the different structured light patterns projected onto the object is determined based on ongoing processing of the image data pieces, such that each object is reconstructed using a specific number of different structured light patterns.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 2A-C exemplify a projector according to one specific non-limiting embodiment of the invention;

FIG. 3A shows the exemplary set of five patterns; FIG. 3B shows a spatial-temporal sequence of binary-coded patterns of the structured light; FIG. 3C shows the object illuminated by different structured light patterns at different moments of time;

FIG. 9A shows grating period; FIG. 9B shows aspect ratio of groove depth to period; FIG. 9C shows slant angle; FIG. 9D shows groove peak position;

FIGS. 10A-B show a temporal sequence of binary-coded patterns of the structured illumination and their corresponding VCSEL array switched on; FIG. 10A VCSEL arrays, FIG. 10B Binary code patterns;

FIG. 11 show schematics of a SL triangulation based 3D scanning system with projector and a projected binary-coded pattern in stationary and mobile systems;

FIGS. 12A-B illustrate estimations of resolution and power density of the structured light pattern created by diffractive top-hat beam shaper, and estimation of resolution of the 3D scanner, assuming that single pixel of the camera is the resolution limit;

FIG. 13 exemplifies three different selected gray patterns projected onto a simulated sphere, using 1200×1600 resolution projector and texture image;

FIGS. 14A1-2 show diffraction efficiency as a function of angle of incidence (AOI) vs grating depth and period respectively, for 0.6328 nm wavelength; FIGS. 14B1-2 show the same for 0.86 nm wavelength;

FIGS. 17A-C show top-hat image plane simulation with cross sections in two directions;

FIGS. 19A-C show different views of the RDDOE beam shaper layout;

FIGS. 20A-B show parameters used for e-beam lithography and microscope images of dose test with given parameters;

FIGS. 22A-D show surface relief profile of the RDDOE beam shaper,

FIGS. 27-30 show experimental structured light patterns that were reconstructed from DOEs with different numbers of the tophat stripes and common dimensions for a specific fan out angle, at a specific distance and two wavelengths;

FIGS. 33A-C show experimental structured light patterns with 16 stripes on an object;

FIG. 35 shows calibration of a 3D scanner configured according to the invention; and FIG. 36 shows 3D reconstruction of a cup using the 3D scanner of the invention.

DETAILED DESCRIPTION OF EMBODIMENTS

One of the industrial fields that can utilize the invention is 3D scanning and imaging using structured light (SL) triangulation method, where mass production of a low cost, high resolution, and high power dynamic light projector is desired. Digitally acquiring the shape of a 3D object is bridging between computer systems and real world and vice versa. The widely used triangulation principle is based on the geometric relationship between the location of the imaging sensor, SL projector, and the object surface points. The principal method for high resolution and fast 3D surface imaging is based on the use of SL; i.e., active illumination of the scene with specially designed two-dimensional (2D) spatially varying light intensity pattern, as will be further illustrated below.

Figure 1:
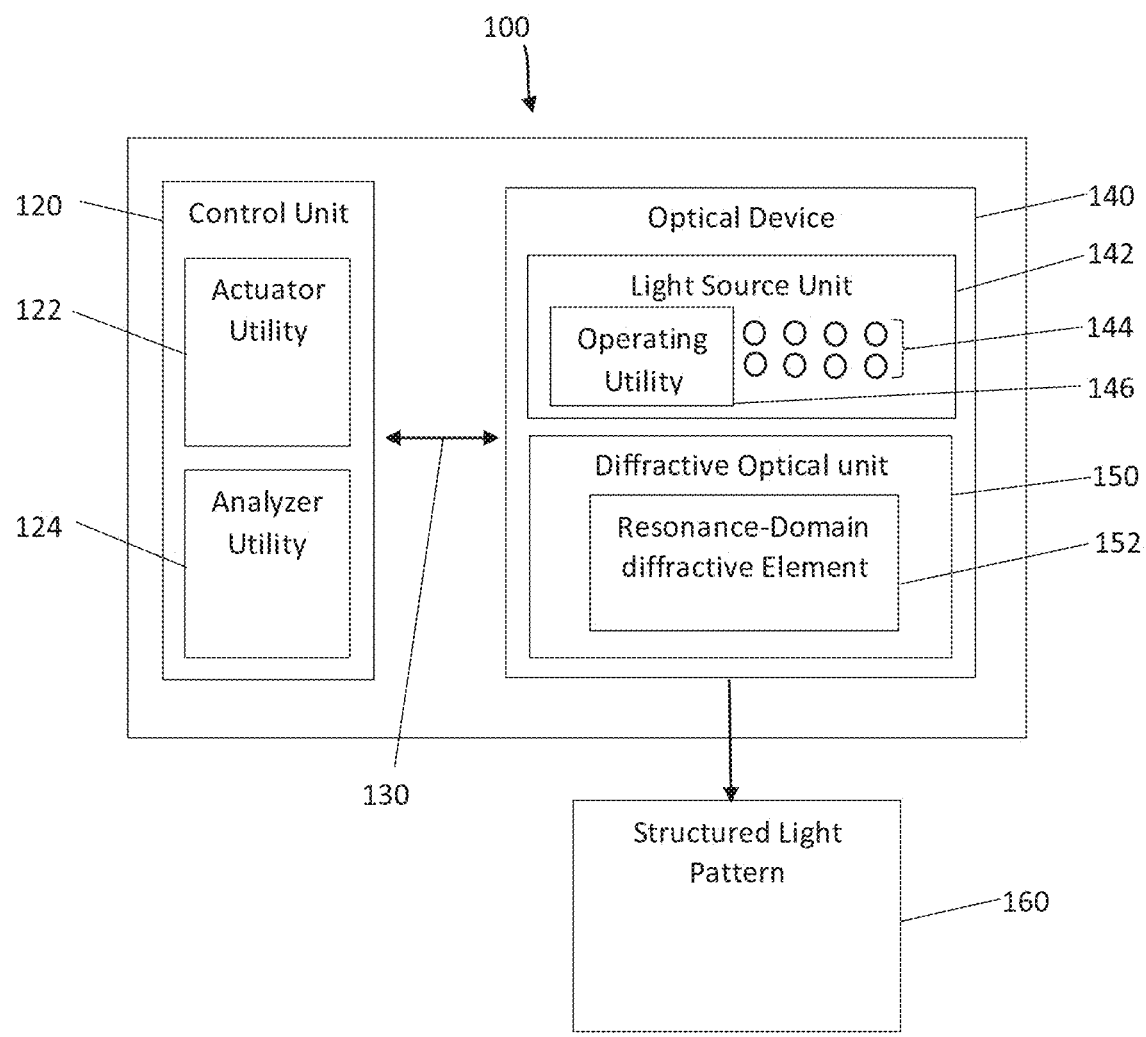
FIG. 1 is a schematic block-diagram illustration of a projector according to exemplary embodiments of the invention.

Reference is made to FIG. 1 illustrating a projector 100 of the present invention configured for creating structured light pattern(s) 160. The projector 100 includes an optical device 140 and a control unit 120 that controls the operation of the optical device 140. The optical device 140 and the control unit 120 communicate with each other via a connection 130 which can be wired or wireless as well known in the art.

The optical device 140 operates as a structured light generator that is controllably operated to produce various structured light patterns. The optical device 140 includes a light source unit 142 that generates one or more light beams. As such, the light source unit 142 includes one or more light sources configured for generating the one or more light beams. More specifically, in some embodiments, the invention utilizes a structured light generator in the form of a light source unit 142 which produces light by the included array of light sources 144, each light source typically produces a light beam. The invention more specifically utilizes an array of lasers and is therefore described below with respect to this specific example. It should however be understood, and indicated above, that the principles of the invention are not limited to this specific example. The light sources can be of any suitable kind, such as LEDs. Preferably, the light sources are lasers, and more specifically vertical-cavity surface emitting lasers (VCSELs). As indicated above, generally, the light source may be constituted by a light emitter itself (e.g. laser) or a light output region associated with (optically coupled to) an external light emitter. The array of light sources 144 can be formed by individual light sources, groups of individual light sources or sub-arrays where each sub-array includes one or more individual light sources. Therefore, the array of light sources, as used herein, should be interpreted broadly.

The control unit 120 includes an actuator utility 122 which selectively actuates the light sources in the array by controlling an operating utility 146 located in the light source unit 142 and connected to each of the light sources in the array of light sources 144. Accordingly, the actuator utility 122 of the control unit 120 receives an input from a user (via appropriate user interface) or a preprogrammed controller as the case may be, and generates a respective output which selectively activates predetermined light sources in the array to produce the light beams used for creating a specific structured light pattern 160. To create a specific pattern, the light sources are controlled by the actuator utility in an individual or collective (i.e. in sets/ groups/sub-arrays) manner The actuator utility 122 is configured to generate specific time-based illumination sessions that activate the suitable light sources each time.

This way, the projector 100 is configured to successively produce a desired sequence of different structured light patterns 160, when each structured light pattern is obtained by an illumination session that includes simultaneous activation of different light sources in the light sources array 144. The projector therefore includes a light sources array 144 which is defined and chosen according to the different structured light patterns being of interest.

The optical device 140 also includes a diffractive optical unit 150 that functions as a light beam shaper for directing, shaping and focusing the light beams produced by the light sources 144 to thereby produce the structured light pattern 160 on a predetermined surface found at defined distance and elevation from the projector 100, with a sufficient resolution. Beam shaping is enabled by the two-dimensional structural configuration of the gratings with varying local period (non-periodic) in the diffractive optical unit 150. It is noted that the diffractive optical unit 150, being a non-periodic diffractive element, is capable of directing the light beams incident thereon and focusing the light beams onto the illuminated object, while being directly accommodated at the output of the light source unit 142 and directly facing the object, i.e. without any intermediate optical element such as a collimating element between the light source unit 142 and the diffractive optical unit 150, or a focusing element or projection lens between the diffractive optical unit 150 and the object (as can be seen, for example, in FIGS. 2B and 2C herein below). The diffractive optical unit 150 includes a resonance-domain diffractive optical element (RDDOE) 152 responsible for shaping the light beams passing therethrough.

An RDDOE is a diffractive element with a local period comparable to the wavelength of the light beam. Therefore, the RDDOE 152 has one or more predetermined operative wavelength ranges that correspond to the wavelengths of the light that the light sources in the array produce. In one specific embodiment, each specific light source has its corresponding RDDOE or region in the RDDOE where the specific light source and the corresponding RDDOE share a predetermined working wavelength range. Accordingly, the diffractive optical unit 150 is chosen to complement the light sources in the array in that the diffractive optical unit includes one or more RDDOE elements that complement the one or more light sources aligned therewith. In one specific non-limiting example, the array of light sources includes identical light sources working within the same wavelength range, i.e. they are monochromatic light sources. In this case, the RDDOE has corresponding regions, each aligned with one light source, the regions having identical operating wavelength range matching the wavelength range of the light sources. In one another specific example, the light source unit includes a single light source and the RDDOE has one or more regions aligned with the light source, the regions having identical operating wavelength range matching the wavelength range of the light source. To this end, the RDDOE 152 is accommodated in an optical path of the light beams generated by the light sources, directly facing the light sources, such that each of the light beams passes through a respective location on the RDDOE 152. In one example, the RDDOE has an array of patterned regions (not shown), each such array of patterned regions is optically aligned with a respective sub-array (e.g. a single light source) of the array of light sources 144. Generally, the structured light pattern which is produced by a pair of optically aligned single light source and the single patterned region of the RDDOE has a rectangular shape. Therefore, the structured light pattern produced by a line-array of light sources optically aligned with a corresponding patterned region in the RDDOE is a light line (e.g., a stripe).

In the described example, the control unit 120 further includes an analyzer utility 124 which is configured and operable to control the number of the illumination sessions needed to create the sequence of the desired structured light patterns. For example, the analyzer unit receives verification image and determines whether this data is sufficient to 3D image reconstruction or additional illumination sessions with the structured light should be carried out.

Reference is made to FIGS. 2A-2C illustrating one non-limiting example of a projector according to one exemplary embodiment of the invention. In this example, schematics of an optical device 240, forming part of a projector, for projection of time-sequence of SL patterns 260 is shown. The optical device 240 includes a light source unit 242 and a diffractive optical unit 250, configured and operable generally as described above. The light source unit 240 includes an array of the light sources 244, e.g. VCSELs, with temporally controllable light power being operable by the operating utility 246 which communicates with a control unit (not shown). In this example, as shown, the array of light sources 244 includes a set of four sub-arrays 244A-D, each including eight light sources. The light sources are configured to be controlled as sub-arrays such that all the light sources in each sub-array are turned on or off together. The diffractive optical unit 250 includes a resonance-domain diffractive optical element configured as a set of sub-arrays of static diffractive optical elements 252A-D (RDDOEs) associated respectively with the sub-arrays 244A-D of the light sources, as illustrated by the arrows 270. As such, each sub-array of the resonance-domain diffractive optical element includes eight different RDDOEs associated with the eight light sources in each sub-array 244A-D. Being non-periodic, with spatially two-dimensional varying grating period, the RDDOEs 252A-D are configured to direct and shape the light generated by the respective light sources into a set of sub-patterns and primitive shapes that in their plurality constitute each and every structured light pattern 260. The operating utility 246 functions as a multichannel temporal signal controller being electronically connected to the sub-arrays of the light sources and configured to put-on said set of sub-patterns and primitive shapes at a time frame that is dedicated for each spatially structured light pattern.

FIG. 2B shows optical scheme of a non-limiting example of the projector of the invention, where light beams generated by independently addressable sub-array of light sources 244X, called sometimes here IAVA, are shaped by an associated sub-array of RDDOEs 252X to create a single sub-pattern 260X (line stripe) of binary-coded pattern. It should be noted that the light source array 244 and the resonance-domain diffractive optical element 252 are inclined with respect to each other, i.e. they are off-axis and not parallel. The off-axis configuration is necessary to achieve comparable to wavelength feature-size in diffractive optical element, as required in the resonance domain of diffraction. In particular, in some embodiments, the angles in the off-axis configuration correspond to Bragg angle of diffraction for the laser wavelength. Such configuration leads to high diffraction efficiency, minimization of power losses and efficient use of the laser power. It is also noted that, as shown, the diffractive optical element 252 is accommodated directly at the output of, and facing, the light source array 244, without any optical element in the optical path between the light source array 244 and the diffractive optical element 252.

FIG. 2C shows entire structured light pattern 262 created altogether by the set of all sub-arrays of IAVAs 244 turned on and the respective RDDOE beam shapers 252.

The RDDOEs convert each IAVA into a sub pattern (e.g. a segment of a line stripe) in the SL pattern 262. To provide time variable (dynamic) sequence of sequential patterns, the projector of the invention dynamically controls the turning on and off of each IAVA (sub-array of light sources). Each of the spatial intensity-varying patterns will be formed by a different combination of turned on and off IAVAs. The entire set of RDDOEs and VCSELs yields a sequence of binary-coded structured light patterns onto an image plane of an imaged 3D object. The projector is capable of projecting any time sequence of binary or grey level structured light patterns.

In the described example of FIG. 2C, the structured light pattern includes lit parts (lines, stripes) separated by boundaries extending parallel to a vertical axis. It should be understood that the structured light pattern created by the projector of the present invention can be in other forms including, but not limited to, light lines split in one of the following: parts by boundaries extending parallel to a horizontal axis, parts by boundaries extending in both the horizontal axis and vertical axis, parts by straight boundaries extending in oblique directions, or parts by curved boundaries in a plane that is lateral to propagation directions of the light beams; or the structured light pattern may include set(s) of spots with random or deterministic locations. Further, a single structured light pattern may include both lines (stripes) and spots.

Figure 3A:
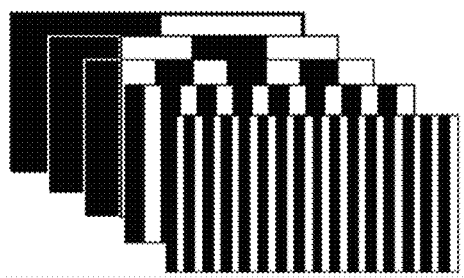
FIGS. 3A-C show a non-limiting example of sequential binary-coded SL pattern projections for 3D imaging.
Figure 3B:
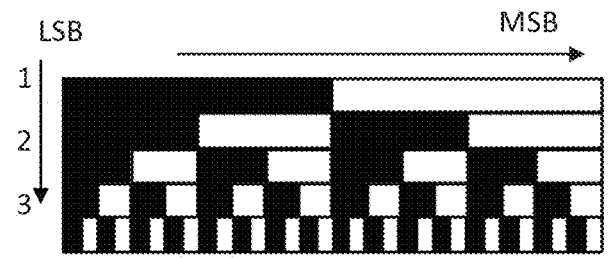
Figure 3C:

Various schemes for the structured light patterns and optical arrangements are known for the 3D scanning An example of sequential binary-coded structured light patterns is illustrated in FIGS. 3A-C. The spatially intensity-varying two-dimensional (2D) structured illumination is generated by a dynamic projector. The intensity of each pixel on the SL pattern is represented by the digital signal $\{I_{ij}=(i,j), i=1, 2, \ldots I, k=1,2, \ldots J\}$ where .(i,j). represent the (x,y) coordinates of the projected SL pattern. FIG. 3A illustrates a time sequence of five SL patterns, for example, that can be generated by the projector of the present invention and used in 3D scanning and reconstruction of scanned objects. Each one of the five SL patterns is achieved by a corresponding combination of turned-on IAVAs of the light source unit (242 in FIG. 2A). The number and order of the individual SL patterns (in a time sequence) projected onto an object, to thereby reconstruct the object, can be determined and controlled by the control unit (120 in FIG. 1) based on the ongoing reconstruction data received during the scanning process. The reconstruction data is affected from one or more characteristics of the object/scene under reconstruction, including but not limited to surface complexity, size, distance from projector and others. In other words, the projector of the present invention, via its control unit for example, is capable of producing costumed number and forms of the structured light patterns in order to reconstruct a specific object. During the scanning and the analysis of the image data received after each or set of projections of structured light pattern(s) onto the object, the control unit of the projector determines if more projections and what kind of projections are needed to successfully reconstruct the object with predetermined resolution and/or accuracy.

FIG. 3B illustrates the spatial-temporal activation of the individual IAVAs in the light source unit in order to generate the five SL patterns of FIG. 3A. The spatial activation is illustrated along the horizontal axis X and the temporal activation is illustrated along the vertical axis Y, when dark/black means on-state and light/white means off-state of the specific IAVA. The black and white stripes in the horizontal axis X correspond to the spatial patterns shown in FIG. 3A.

An example of illuminating an object with sequential different SL patterns in the aim of reconstructing the object in 3D is illustrated in FIG. 3C.

As will be further described below, the object/scene can be reconstructed with the projector of the present invention using the known triangulation method. An imaging sensor (a video camera, for example) is used to acquire a 2D image of the object/scene under the SL illumination. If the scene is a planar surface without any 3D surface variation, the pattern shown in the acquired image is similar to that of the projected SL pattern. However, when the surface in the scene is nonplanar, the geometric shape of the surface distorts the projected SL pattern as seen from the camera. The principle of SL 3D surface imaging techniques is to extract the 3D surface shape based on the information from the distortion of the projected SL pattern. Accurate 3D surface profiles of objects in the scene can be computed by using various SL principles and algorithms In the following, various aspects of the projector of the present invention are described with relation to non-limiting experiments performed and components chosen by the inventors.

Figure 4:
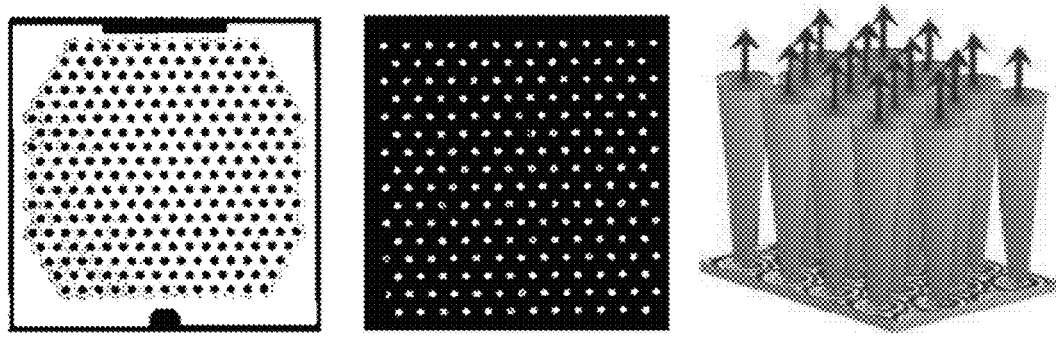
FIG. 4 shows typical 2D high power VCSEL array (left) and their near field emission (middle and right)

Arrays of VCSEL are produced with matured off-the-shelf technology, and are used in several industrial fields, including optical communication and sensors. The VCSELs can deliver high peak power with wavelength stability, and reduced temporal coherence (no speckles). High power operation in a VCSEL can be achieved by either scaling the emitting region in diameter (typical Datacom VCSELs are ~10 μm) up to 100 μm or larger, or using 2 dimensional arrays of individual emitters. To preserve low manufacturing cost and obtain optimal device performance, the scale is done using a 2D array of individual emitters. An example of a typical top emitting VCSEL laser array with approximately 200 individual VCSEL emitters is shown in FIG. 4.

Scaling of power with a 2D array has several advantages in the application. Firstly, the lasers are all emitting independently, so the coherence of the source is reduced, but since the VCSELs are all in close proximity, the emission wavelength is still very tightly controlled. Secondly, an individual element in the array can fail, but the overall power and source properties are only modestly affected. Thirdly, the heat generated by the laser is spread over a larger area and thus allows for improved heat-sinking.

The benefit of pulsed drive current depends on the pulse width and duty cycle which ultimately determine the overall temperature rise of the VCSEL and the package.

Figure 5:
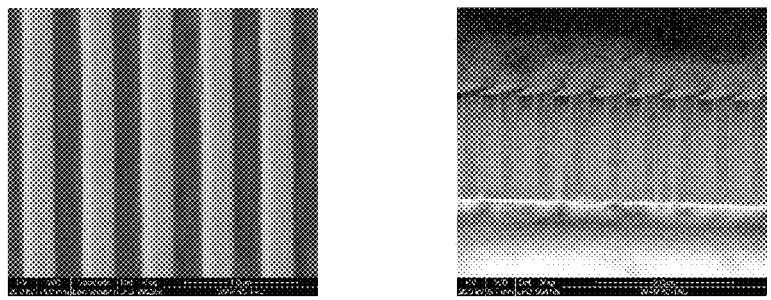
FIG. 5 shows ESEM images of a section of a resonance domain DOE. (a) Top-view and (b) cross section images of at magnification of about 100,000 and 60,000 respectively.

Diffractive optical elements in the resonance domain can provide more than 80% diffraction efficiency with high NA. The inventors have designed and fabricated high-efficiency binary off-axis resonance domain diffractive lenses and diffraction gratings with very high spectroscopic spatial frequency of 2000 lp/mm The fabrication technology included direct e-beam writing of the spatial pattern, transferring the recorded pattern to a submicron Chrome mask by $Cl_2$ plasma reactive ion etching (RIE), and transferring the spatial pattern from the Chrome mask to the fused silica (FS) substrate by $CHF_3$ plasma RIE. Typical environmental scanning electron microscopy (ESEM) images of magnified sections, upper and side sectional views, from the fabricated FS resonance domain diffraction gratings are shown in FIG. 5. The high 0.14 NA of the lens is exceeding 10 times the limit of scalar diffractive optics. Measured diffraction efficiency 83% of the lens is exceeding twice the known limits of thin binary optics. The binary diffraction grating shows 75° separation between the 1st and zero diffraction orders and measured diffraction efficiency 97.4%.

Figure 6:
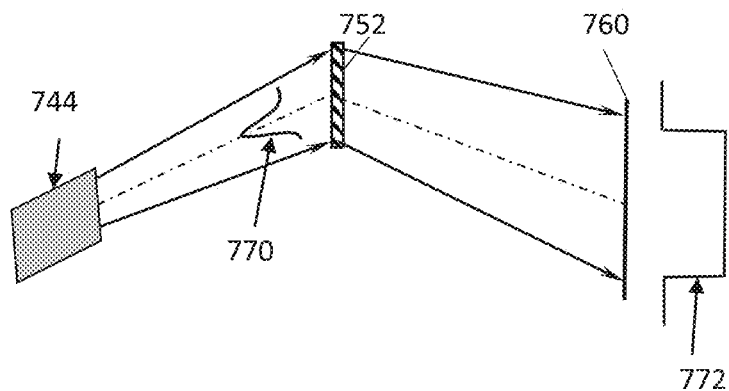
FIG. 6 shows a resonance-domain DOE beam shaper that converts a Gaussian beam of a VCSEL into a rectangle with uniform top-hat intensity distribution.

In non-limiting exemplary embodiments, top-hat beam shapers are used to create SL illumination patterns. as mentioned above, beam shaping is enabled by the non-periodic configuration of the RDDOE of the invention. As shown in FIG. 6, the operational goal of the RDDOE beam shaper 752 is to convert a Gaussian beam 770 generated by a VCSEL 744 into a rectangle 772 with uniform top-hat intensity distribution at a projection plane 760. Such rectangle can be part of a line stripe of each SL sub-pattern. Formation of a full line stipe (sub-pattern) of the SL pattern is done by switching on all the light source members of a VCSEL array (IAVA). Several lines stripes, which form an SL pattern, are formed by switching on several VCSEL arrays. Dynamic sequence of SL patterns is achieved by switching on different sets of the VCSEL arrays at different times, in accordance with a predetermined time diagram.

Figure 7:
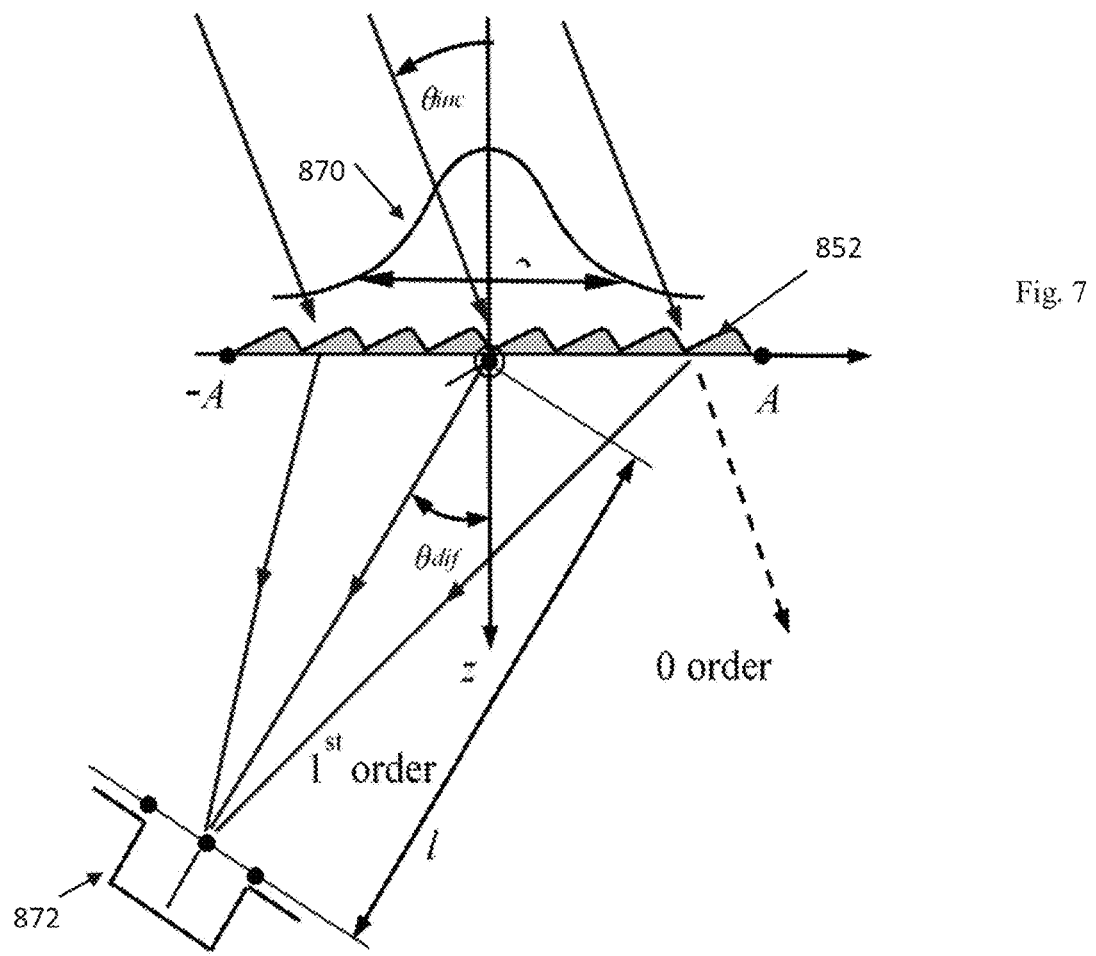
FIG. 7 shows off-axis conversion of a Gaussian beam into a top-hat beam.

As illustrated in FIG. 7, the beam shaper 852 with the size 2A×2B of the clear aperture is considered, where A is size in u axis direction, B is size in v axis direction, and where u, v are Cartesian coordinates in the plane of the beam shaper. Incident beam 870 with wavelength λ, preferably with Gaussian intensity, illuminates the plane of the beam shaper 852. The beam shaper is configured to convert the incident beam 870 into output beam 872 with an intensity distribution I(x) that is nonzero within rectangle with dimensions 2a×2b in the output plane located at the distance l from the beam shaper. In a case of a top-hat beam shaper intensity distribution is I=const. The scheme is off-set with preferably Bragg angle of incidence, to keep local DOE periods in the range of the resonance domain for a given wavelength.

The illuminating beam provides at the DOE plane with Cartesian coordinates, the eikonal $S_{inc}(u)$, phase $kS_{inc}(u)$ and the intensity $I_{inc}(u)$, $k=2\pi/\lambda$. In a special case of Gaussian incident beam the eikonal is defined as $$S_{inc}(u) = \frac{u^2}{2l_0} + \sin\theta_{inc}\, u \tag{1}$$

and the intensity is $$I_{inc}(u) = \text{const}\, \exp(-2u^2/\sigma^2), \tag{2}$$

where $l_0$ is the radius of curvature of incident Gaussian beam wavefront, σ is the size parameter of Gaussian beam at the level of exp(−2) of intensity fall in the plane of the DOE, $\theta_{inc}$ is angle of incidence corresponding to the Bragg angle of the resonance domain grating incorporated into the RDDOE beam shaper.

The RDDOE beam shaper is described by the phase function $$\varphi(u) = k\psi(u),\; k = \frac{2\pi}{\lambda}. \tag{3}$$

Light field that is created just after the RDDOE beam shaper has the phase $$kS = kS_{inc} + \varphi = kS_{inc} + \psi \tag{4}$$

and the intensity $I_0$ propagates from the plane of beam shaper to the output plane and forms the shaped intensity there. Thus, the problem of beam shaper design can be described as the following inverse task: function φ is to be found when the λ, 2A×2B, $l_0$, 2a×2b, l are given.

Figure 8:
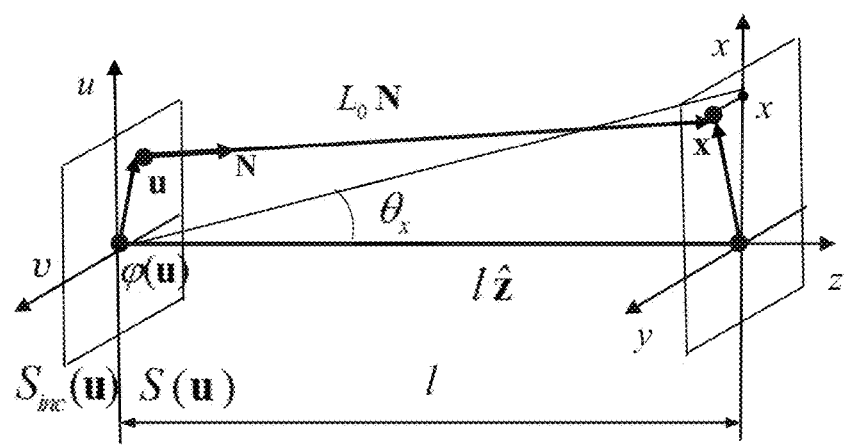
FIG. 8 shows geometrical optics arrangement for a map transformation design of the resonance-domain DOE beam shaper.

Analytical solution for the phase function of the beam shaper is provided here by ray-tracing considerations for the input $S_0$ and output S eikonals in the beam shaper's plane, as illustrated in FIG. 8. 2-D Cartesian coordinates x=(x, y) are defined in the output plane. Geometrical optics eikonal equations N=∇S in beam shaping are related to the first derivatives of the eikonals $$\nabla_\perp S_{inc}(u) = \nabla_\perp \left(\frac{u^2}{2l_0} + \sin\theta_{inc} u\right) = \frac{u}{l_0} + \sin\theta_{inc}, \tag{5}$$

$$\nabla_\perp = \left(\frac{\partial}{\partial u}, \frac{\partial}{\partial v}\right)$$

$$\nabla_\perp S(u) = N_\perp = \frac{x-u}{L} \cong \frac{x-u}{l},\; L = \sqrt{l^2 + |x-u|^2} \tag{6}$$

$$\sqrt{1 - |\nabla_\perp S(u)|^2} = \frac{l}{L} \cong 1 \tag{7}$$

$$N = \frac{x-u+l\hat{z}}{L},\; N_\perp = \frac{x-u}{\sqrt{l^2+|x-u|^2}} \cong \frac{x-u}{l}, \tag{8}$$

$$N_z = \frac{l}{\sqrt{l^2+|x-u|^2}} \cong 1$$

where L is the distance from the point u to the corresponding point x=x(u) which is expected to lie on the same ray as u; an approximation sign indicates the paraxial approximation. Accordingly, eikonal S just after the RDDOE beam shaper can be restored from its gradient by integration along some path in the u-plane:

$$S(u) = \int_{u_0}^{u} \nabla_\perp S \cdot dr \tag{9}$$

The correspondence x=x(u) is obtained from the special form of power conservation relations used for non-interacting ray tubes rather than for the total cross-sections of the beam. Differential form equations are $$I(x)\det\frac{\partial x}{\partial u} = I_{inc}(u) \text{ where} \tag{10}$$

$$\frac{\partial x}{\partial u} = \begin{bmatrix} \frac{\partial x}{\partial u} & \frac{\partial x}{\partial v} \\ \frac{\partial y}{\partial u} & \frac{\partial y}{\partial v} \end{bmatrix} \tag{11}$$

Integral form of equations can be based on integral Poynting theorem from light flux conservation, which is applicable in geometrical optics to any part of surface limited by respective ray bundle. Then, two integral functions $P_{inc}$ for $I_{inc}(u)$ and P for I(x) are obtained. $P_{inc0}$ and $P_0$ are denoted for entire integrals of $I_{inc}(u)$ and I(x).

The beam shaper's phase function is found as $$k\psi(u) = k[S(u) - S_{inc}(u)] \tag{12}$$

and can be expressed as $$\varphi(u) = -k\frac{u^2}{2f} - 2\sin\theta_{inc}\, u + \varphi_a(u) \tag{13}$$

where $l_0$ is the radius of curvature of incident Gaussian beam wavefront, f is a focal length of a focusing diffractive lens incorporated into the RDDOE beam shaper and $\varphi_a(u)$ is shaping addition to the focusing diffractive lens. As appreciated, Eq. 13 illustrates, among other things, the two-dimensional nature of the beam shaper. It is assumed that the focus of the focusing diffractive lens is chosen so that without shaping (when $\varphi_a(u)=0$) the point source of the incident beam is imaged to the top-hat output plane, i.e.

$$\frac{1}{f} = \frac{1}{l_0} + \frac{1}{l} \tag{14}$$

In a case of separated variables u,v (two-dimensional):

$$\varphi_a(u)=\varphi_{ax}(u)+\varphi_{ay}(v),\ u=(u,v) \tag{15}$$

$$\psi(u,v)=\psi^{(x)}(u)+\psi^{(y)}(v) \tag{16}$$

Important to note that $P_{inc}$ for $I_{inc}(u)$ should be calculated on the side of the incident beam, because it is related to incident beam, whereas P for I(x) should be calculated on the side of the diffracted beam.

In a case of separated rectangular ray-tubes, typical for the geometrical optics, there is a correspondence x(u) or in scalar form x=x(u), y=y(v) and the light flux is conserved along the ray bungles, in addition to being conserved integrally in entire cross-section of the beam. As shaper is transparent and phase only, optical flux density is same before and after the shaper. As equations for $I_{inc}(u)$ and I(x) are not matched to the actual light fluxes, The inventors compared normalized powers (i.e. powers for total light flux 1 W/m² through the DOE). Accordingly, scales for the light fluxes before and after the DOE shaper are defined as $$P_{inc0} = \int I_{inc}(u)d^2u \tag{17}$$

$$P_0 = \int I(x)d^2x \tag{18}$$

where integrals are taken within entire RDDOE aperture and within entire shaped 2D domain respectively.

For each point u and corresponding point x(u), the inventors define corresponding 2D domains starting from the origin of coordinates and bounded by an expanding sequence of ray bundles. The integral light fixes within them are $$P_{inc}(u) = \int_0^u I_{inc}(u)d^2u \tag{19}$$

$$P(x) = \int_0^x I(x)d^2x \tag{20}$$

normalized light fluxes before and after the beam shaper can be defined $$P_{incNorm}(u) = \frac{P_{inc}(u)}{P_{inc0}} \tag{21}$$

$$P_{outNorm}(x) = \frac{P(x)}{P_0} \tag{22}$$

and equaled in accordance to the power conservation law for each in expanding sequence of ray bundles.

In a 1D case or case with separable u, v variables in the range $|u| \le A$, the Eqs. (19)-(22) reduce to following. At the incident beam side (before beam shaper):

$$P_{inc}(u) = \int_0^u I_{inc}(u)d|u| = \begin{cases} \int_0^u I_{inc}(u)du, & 0 \le u \le A \\ \int_0^u I_{inc}(u)du, & -A \le u < 0 \end{cases} \tag{23}$$

$$P_{inc0} = P_{inc}(-A) + P_{inc}(A) \tag{24}$$

$$P_{incNorm}(u) = \frac{P_{inc}(u)}{P_{inc0}} \tag{25}$$

Specifically, for Gaussian input intensity distribution:

$$I_{inc}(u) = \begin{cases} I_{inc0}\exp\left(-\frac{2u^2}{\sigma^2}\right), & |u| \le A \\ 0, & \text{else} \end{cases} \tag{26}$$

$$P_{inc}(u) = I_{inc0}\frac{\sigma\sqrt{\pi}}{2\sqrt{2}}erf\left(\frac{|u|\sqrt{2}}{\sigma}\right) \tag{27}$$

where $$erf(t) = \frac{2}{\sqrt{\pi}}\int_0^t \exp(-s^2)ds \tag{28}$$

Then $$P_{inc0} = 2P_{inc}(A) = I_{inc0}\frac{\sigma\sqrt{\pi}}{\sqrt{2}}erf\left(\frac{\sqrt{2}A}{\sigma}\right), \tag{29}$$

$$P_{incNorm}(u) = \frac{1}{2}erf\left(\frac{|u|\sqrt{2}}{\sigma}\right)/erf\left(\frac{A\sqrt{2}}{\sigma}\right), \tag{30}$$

For output shaped beam $$P(x) = \int_0^x I(x)d|x| = \begin{cases} \int_0^x I(x)dx, & 0 \le x \le a \\ \int_0^x I(x)dx, & -a \le y < 0 \end{cases} \tag{31}$$

$$P_0 = P(-a) + P(a) \tag{32}$$

$$P_{outNorm}(x) = \frac{P(x)}{P_0} \tag{33}$$

Specifically, for uniform "top-hat" output distribution of the output shaped beam $$I(x) = \begin{cases} I \equiv const, & |x| \le a \\ 0, & \text{else} \end{cases} \tag{34}$$

$$P(x)|x|I,\ |x| \le a \tag{35}$$

$$P_0 = 2P(a) = 2a\ I \tag{36}$$

$$P_{outNorm}(x) = \frac{P(x)}{P_0} = \frac{|x|}{2a},\ |x| \le a \tag{37}$$

The 1D geometrical optics power conservation relations are $$P_{incNorm}(u) = P_{outNorm}[x(u)], |u| \leq A, |x(u)| \leq a, x(A) = a \quad (38)$$

The mapping $x = x(u)$ of coordinates for ray-tracing correspondence ("map transformation") can be found by solving above equation with $$|u| \leq A, |x(u)| \leq a, x(A) = a. \quad (39)$$

Specifically, in the case of Gaussian incident beam and top-hat output, the mapping of coordinates is defined from equation $$x(u) = a \, erf\left(\frac{u\sqrt{2}}{\sigma}\right) \Big/ erf\left(\frac{A\sqrt{2}}{\sigma}\right), |x| \leq a, |u| \leq A \quad (40)$$

Now, the 2D eikonal after the beam shaper can be determined from equations $$\nabla_\perp \varphi(u) = k \nabla_\perp \psi(u) \quad (41)$$

$$\nabla_\perp \psi(u) = \quad (42)$$

$$\nabla_\perp S(u) - \nabla_\perp S_{inc}(u) = \frac{x-u}{L} - \frac{i}{l_0} - \sin\theta_{inc} \cong \frac{x(u)}{l} - \frac{u}{f} - \sin\theta_{inc}$$

Accordingly, the 1D eikonal is determined by equation $$\frac{dS}{du} = \frac{x(u)}{\sqrt{l^2 + x^2(u)}} - \frac{u}{f} \cong \frac{x(u)}{l} - \frac{u}{f} \quad (43)$$

The 1D eikonal in integral form is $$S(u) = \int_0^u \frac{dS}{du} du = \int_0^u \frac{x(u)}{\sqrt{l^2 + x^2(u)}} du - \frac{u^2}{2f} \cong \frac{1}{l}\int_0^u x(u)du - \frac{u^2}{2f} \quad (44)$$

The 1D (in x) phase function of the RDDOE is $$\varphi^{(x)}(u) = k\psi^{(x)}(u) \quad (45)$$

where $$\psi^{(x)}(u) = S^{(x)}(u) - S_{inc}^{(s)}(u) \quad (46)$$

is the 1D eikonal function of the DOE.

In a case of separable x,y variables the 2D eikonal function of the RDDOE beam shaper is $$\psi(u,v) = \psi^{(x)}(u) + \psi^{(y)}(v) \quad (47)$$

The 1D (in y) functions $y(v)$ and $\varphi^{(y)}(v)$ are defined by the similar equations as functions $x(u)$ and $\varphi_x(u)$ but with variables v,b,B instead of u,a,A respectively.

In a special case of Gaussian beam used in this task:

$$\psi^{(x)}(u) = \quad (48)$$

$$\frac{a}{l \, erf(\sqrt{2}A/\sigma)} \cdot \left\{ u \, erf\left(\frac{u\sqrt{2}}{\sigma}\right) - \frac{\sigma}{\sqrt{2\pi}}\left[1 - \exp\left(-\frac{2u^2}{\sigma^2}\right)\right] \right\} -$$

$$\frac{u^2}{2f} - 2\sin\theta_{inc} \, u,$$

Full equation for case of Gaussian to top-hat paraxial beam shaper, $$\psi(u,v) = \psi^{(x)}(u) + \psi^{(y)}(v) = \quad (49)$$

$$\frac{a}{l \, erf\left(\frac{\sqrt{2}A}{\sigma}\right)}\left\{ u \, erf\left(\frac{\sqrt{2}u}{\sigma}\right) - \frac{\sigma}{\sqrt{2}}\frac{1}{\sqrt{\pi}}\left[1 - \exp\left(-\frac{2u^2}{\sigma^2}\right)\right]\right\} -$$

$$\frac{u^2}{2f} - 2\sin\theta_{inc} \, u +$$

$$\frac{b}{l \, erf\left(\frac{\sqrt{2}B}{\sigma}\right)}\left\{ v \, erf\left(\frac{\sqrt{2}v}{\sigma}\right) - \frac{\sigma}{\sqrt{2}}\frac{1}{\sqrt{\pi}}\left[1 - \exp\left(-\frac{2v^2}{\sigma^2}\right)\right]\right\} - \frac{v^2}{2f}$$

where $$\frac{1}{f} = \frac{1}{l_0} + \frac{1}{l}. \quad (50)$$

Again, the above Eq. 49, for example, illustrates the two-dimensional configuration of the DOE, enabling collimation and focusing of the light beams, such that the DOE can be connected directly to and faces the light source.

To find the locations of the RDDOE diffractive zones from the smooth eikonal function Eq. (3), an isoline equation is solved:

$$\varphi_{RDDL} \equiv \frac{2\pi}{\lambda_0} \psi = 2\pi \cdot m, \quad (51)$$

where m is number of $2\pi$ diffractive zone. According to Eq. 51, fringes of the DOE have curved two-dimensional and non-periodic configuration because they are derived from non-periodic 2D phase function. Finally, the RDDOE is composed of binary diffractive zones, each bounded by adjacent isolines numbered as m and m+1. Each binary diffractive zone includes groove and gap, whose relative width is determined by the local duty cycle. It is noted that diffractive grooves in vicinity of x axis are perpendicular to it, same as in classical mounting of the rigorous light diffraction.

Figure 9A:
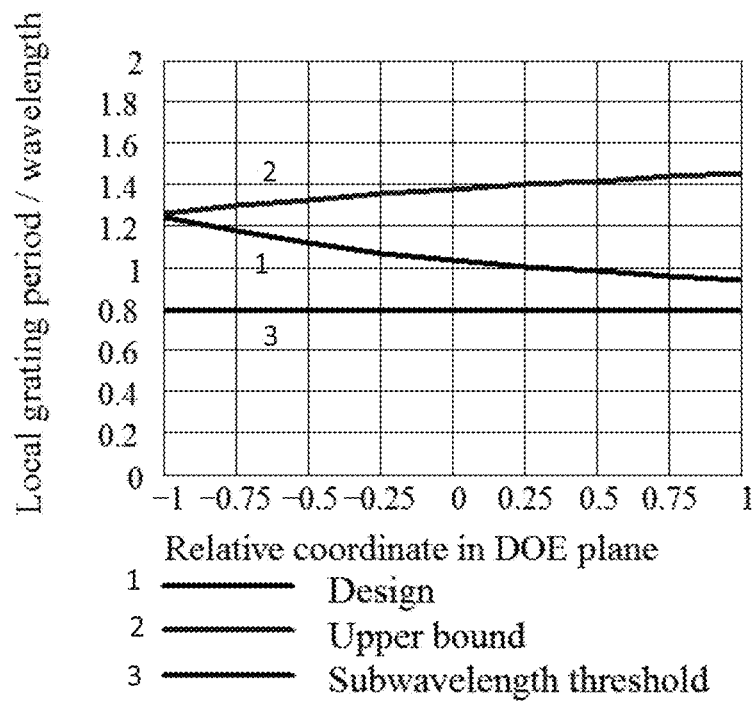
FIGS. 9A-D show designed parameters of local diffraction gratings as functions of the relative coordinate at the plane of the beam shaping resonance-domain DOE.
Figure 9B:
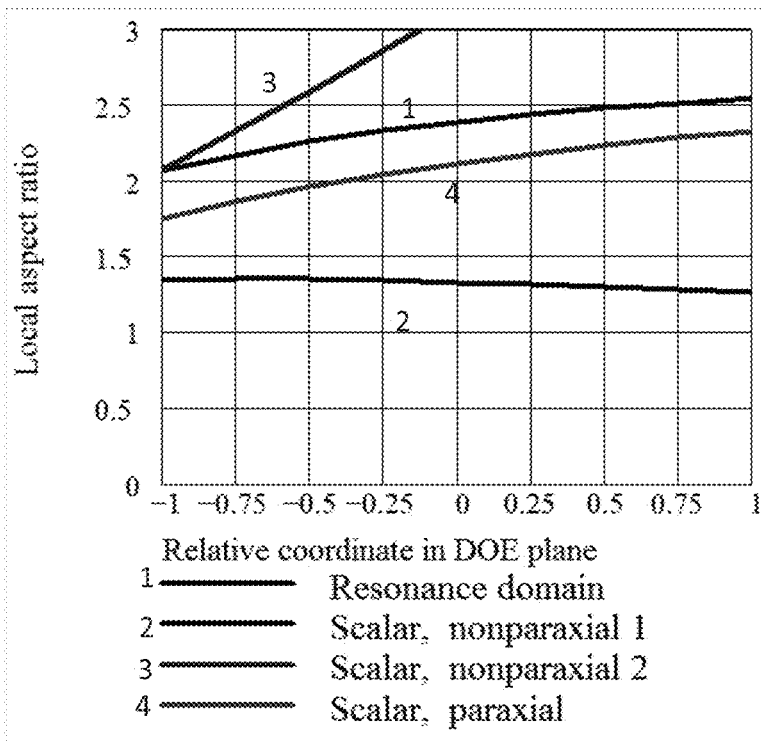
Figure 9C:
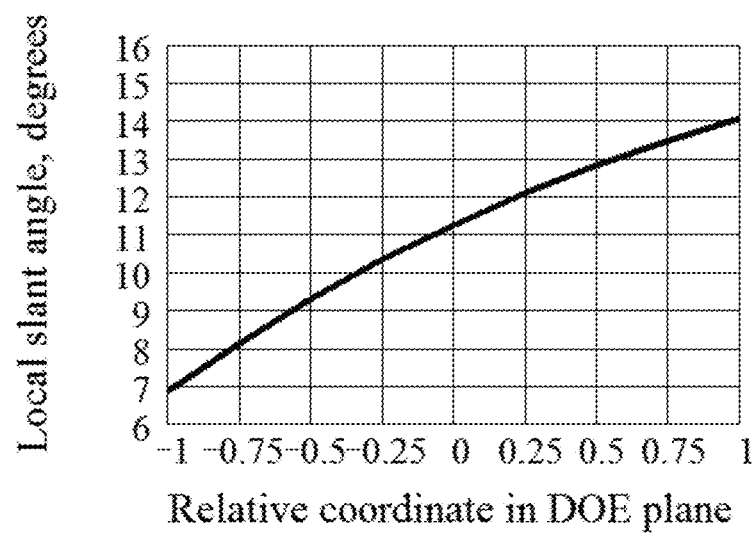
Figure 9D:
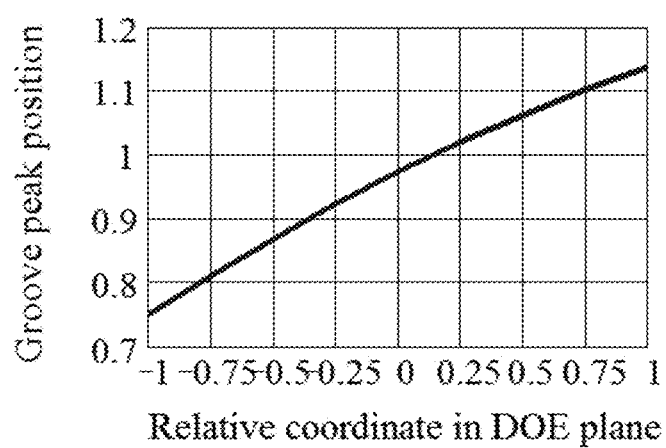

FIGS. 9A-9D show designed parameters of local diffraction gratings as functions of the relative coordinate at the plane of the beam shaping RDDOE. FIG. 9A shows grating period; FIG. 9B shows aspect ratio of groove depth to period; FIG. 9C shows slant angle; FIG. 9D shows groove peak position. The graphs in FIGS. 9A-D provide data that is used in design of the exemplified resonance-domain beam shaper.

In some non-limiting exemplary embodiments, for achieving high diffraction efficiencies $\eta_B^{TE,TM} = 100\%$ at Bragg angle of incidence $\theta_{inc} = \theta_B$ $$\sin\theta_B = \frac{1}{2\hat{\Lambda}}, \quad (42)$$

In transmittance mode, the groove depths are determined depending on TE or TM polarizations of the incident beam of the VCSEL as $$h^{TE} = \frac{\bar{n}\lambda c}{2G_{1s}(n_M^2 - n_i^2)}, h^{TM} = \frac{h^{TE}}{\kappa} \quad (53)$$

where coefficients κ and c>0 are $$\kappa = 1 - \frac{1}{2\bar{n}^2\hat{\Lambda}^2}, c^2 = 1 - \frac{1}{4\bar{n}^2\hat{\Lambda}^2}, \hat{\Lambda} = \frac{\Lambda}{\lambda}. \quad (54)$$

and Λ is local grating period, h groove depth, q is the duty cycle, $n_M$ and $n_i$ refractive indices in grating grooves and gaps respectively, $$\bar{n}^2 = n_i^2(1-q) + n_M^2 \cdot q, \quad (55)$$

is the mean square averaged refractive index of the grooves material and air, and $G_{1s}$ is the $1^{st}$ Fourier coefficient of the normalized binary rectangular groove profile $$G_{1s} = q \operatorname{sinc}(q), \operatorname{sinc}(t) = \frac{\sin(\pi t)}{\pi t}. \quad (56)$$

A common technique for ranging is stereovision. It is based on imaging the scene from two or more points of view and then finding correspondences between the different images in order to triangulate the 3D position. Difficulties in finding the correspondences arise, even when taking into account epipolar constraints. Coded structured light consists of replacing one of the two cameras by a device that projects a light pattern onto the measuring surface. Such devices project an image with a certain structure so that a set of pixels are easily distinguishable by means of a local coding strategy. Thus, when locating such coded points in the image grabbed by the remaining camera, their correspondence problem is solved with no need for geometrical constraints. The projecting images are called patterns, since they are globally structured.

In some non-limiting exemplary embodiments, dynamic sequence of SL patterns is used for measuring 3D surface. Techniques which are based on binary codes has only two illumination levels that are commonly used, which are coded as 0 and 1. Every pixel of the pattern has its own codeword formed by the sequence of 0s and 1s corresponding to its value in every projected pattern. Thus, a codeword is obtained once the sequence is completed.

A sequence of m patterns to encode $2^m$ stripes using a plain binary code. The codeword associated to each pixel is the sequence of 0s and 1s obtained from the m patterns, the first pattern being the one which contains the most significant bit. The symbol 0 corresponds to black intensity while 1 corresponds to full illuminated white. Thus, the number of stripes is increasing by a factor of two at every consecutive pattern. Every stripe of the last pattern has its own binary codeword. The maximum number of patterns that can be projected is the resolution in pixels of the projector device or the imaging device whichever comes first.

An example is shown in FIGS. 10A-B. FIG. 10A simply illustrates that the light sources are arranged in sub-arrays (IAVAs) which are activated or inactivated together. Two exemplary IAVAs are highlighted by dashed lines. It should be understood, that in other examples, the light sources can be activated on an individual basis, i.e. each sub-array includes one light source, such as a VCSEL, which is activated or inactivated individually. FIG. 10B illustrates the binary activation status of four IAVAs, both graphically (the graph in the upper part of the figure) and numerically (the table in the lower part of the figure), where 1 means the IAVA is turned on, and 0 means the IAVA is turned off. The total number of activation states for Four IAVAs is 16 ($2^4$), and this is illustrated in the figure, there are 16 different combinations (columns) in the table.

Other coding techniques are possible as well. A Gray code instead of plain binary can be used. The advantages of Gray code is that consecutive codewords have a Hamming distance of one, being more robust against noise.

As said above, the arrays of light sources are preferably VCSELs that can be produced on the base of a mature off-the-shelf technology, and are widely used in several industrial fields, including optical communication and sensors. The VCSELs can deliver high peak power (of ~2 W for 50 ns pulse from 30 VCSELs) with wavelength stability, and reduced temporal coherence.

DOEs in the resonance domain can provide a record of more than 85% diffraction efficiency with high NA ~0.15. The resonance domain DOE can be implemented as a set of diffractive zones with dense groove profiles on a substrate surface.

Major production technologies for the DOE belong to semiconductor industry and include: Direct electron beam writing; Reactive ion etching of fused silica and chromium layers. One non-limiting example for the fabrication technology includes direct e-beam writing of the spatial DOE pattern on an e-beam resist, transferring the recorded pattern to a submicron chrome mask by $Cl_2$ plasma reactive ion etching (RIE), and transferring the spatial pattern from a chrome mask to a fused silica (FS) substrate by $CHF_3$ plasma RIE.

In the following, exemplary non-limiting experimental data of stages executed in accordance with the invention is presented. The experimental data relates, inter alia, to design of the dynamic projector concept, design and computer simulation of the DOE in the projector, and fabrication of the DOE. Design and production of the resonance domain diffractive beam shaper and arrangement of the optical set-up for experimental investigation of the diffractive beam shapers and VCSELs are reported.

Design of the Dynamic Projector Concept:

The specification of the projector, field of view (FOV), projected patterns, depth of field, spatial and depth resolution were defined. Accordingly projector's architecture, spatial arrangement, operating wavelength of IAVAs, number of VCSEL in each array, number of arrays, and required functionality of the DOEs were determined.

FIG. 11 shows an architecture of a projector in a triangulation optical scheme. Triangulation parameters are: d—Projector, camera distance, l—Projector, object distance. Projector and DOE parameters are: D—DOE width, λ—wavelength, 2a—top hat width, 2b—top hat height, FOV—angular field of view. A single row of the light source VCSEL projector is composed of 190×1 VCSELs=7.6 mm×40 μm. Single VCSEL with pitch of 40 μm can deliver peak power of $P_{peak}$=150 mW. The parameters are set following: $D_{DOE}$=3 mm or 20 mm, λ=0.85 μm, $t_{pulse}$=30 ns,

| | |
|---|---|
| $\Delta x_{cam}$ = 1.67 μm | |
| $f_{cam}$ = 12 mm | Active #pixels = 3856 H × 2764 V |
| CamSensor = 6.44 mm(H) × 4.615 mm(V) | Angular FOV H × V = 30° × 21° |

The VCSEL power and projector specifications were considered and calculations were made.

The peak power density of a single VCSEL is $$I = \frac{P_{peak}}{A_{VCSEL}} = 93.7 \frac{MW}{m^2}.$$

Projector magnification:

$$M_{proj}^2 = \frac{2a \cdot 2b}{A_{1D\_VCSEL\_Array}}.$$

The intensity on the image plane is proportional to squared magnification $$M_{proj}^2 = \frac{A_{VCSEL}}{A_{Top\ hat}},$$

i.e.

$$I_{Top\ hat} = \frac{I_{VCSEL}}{M_{proj}^2}.$$

Figures 12B, 13:

The resolution of a projector (3D scanner) with VCSELs and DOE was also estimated, assuming that single pixel of the camera should match to the diffraction resolution limit for the DOE aperture. The tables of FIGS. 12A and 12B show results of the calculations. The table of FIG. 12A shows estimations of resolution and power density of the structured light pattern created by diffractive top-hat beam shaper.

The table of FIG. 12B shows estimation of resolution of the 3D scanner, assuming that single pixel of the camera is the resolution limit.

It is noted that position of lines with known spatial intensity distribution can be determined even better than the single pixel, for certain signal to noise ratios. Accordingly "sub pixel" resolution (better than in FIG. 13B) might be feasible with proper digital image processing.

Based on the above estimations, a 3D scanner with VECSELs and DOEs will have estimated lateral spatial resolution up to 0.26 mrad (5.2 mm for the distance 20 m from the object) and longitudinal (depth) resolution of about 0.04% of the distance (8 mm for distance 20 m). Estimated field of view can be designed from 5° up to 100°.

For further system estimations, a 3D scanner simulator was created based on a freeware available in Internet. The simulator recreates a scene illuminated by a structured light projector and sampled by a camera, and reconstructs the 3D data according to a given camera and specified parameters. The parameters include intrinsic and extrinsic parameters, such as projection and viewing angels, base line and geometrical distortions. Physical model for the simulation resorted to a "pinhole" camera assumptions that yield the following equations.

$$X = \begin{bmatrix} x \\ y \\ z \\ 1 \end{bmatrix}, \tilde{u} = \begin{bmatrix} \tilde{u}_x \\ \tilde{u}_y \\ 1 \end{bmatrix} = \begin{bmatrix} x/z \\ y/z \\ 1 \end{bmatrix}$$

X is object coordinate in camera reference frame $$X = \begin{bmatrix} r_{11} & r_{12} & r_{13} \\ r_{21} & r_{22} & r_{23} \\ r_{31} & r_{32} & r_{33} \end{bmatrix} \cdot \begin{bmatrix} X_w - X_o \\ Y_w - Y_o \\ Z_w - Z_o \end{bmatrix}$$

w—world coordinates
0—object coordinates

Rotation matrix rotates by the angle between coordinate systems $$u = K_c \cdot L(\tilde{u})$$

u—pixel coordinates of image of X in camera plane $$K_c = \begin{bmatrix} f_x & \gamma & O_x \\ 0 & f_y & O_y \\ 0 & 0 & 1 \end{bmatrix}, L(\tilde{u}) = \begin{bmatrix} \tilde{u}_x \cdot (1 + k_1(\tilde{u}_x^2 + \tilde{u}_y^2) + k_2(\tilde{u}_x^4 + \tilde{u}_y^4)) + \Delta_t(\tilde{u}) \\ \tilde{u}_y \cdot (1 + k_1(\tilde{u}_x^2 + \tilde{u}_y^2) + k_2(\tilde{u}_x^4 + \tilde{u}_y^4)) + \Delta_t(\tilde{u}) \\ 1 \end{bmatrix}$$

$$\Delta_t(\tilde{u}) = \begin{bmatrix} 2k_3\tilde{u}_x\tilde{u}_y + k_4(\tilde{u}_y^2 + \tilde{u}_y^2 + 2\tilde{u}_x^2) \\ k_3(\tilde{u}_x^2 + \tilde{u}_y^2 + 2\tilde{u}_y^2) + 2k_4\tilde{u}_x\tilde{u}_y \end{bmatrix}$$

$K_{1,2}$—radial distortaion coefficients
$K_{3,4}$—tangential distortaion coefficients
γ—sheering, usually 0 in digital cameras It is noted that the simulation doesn't yet account for distortion.

The simulator allowed to investigate 3D reconstruction performance with variety of patterns in the VCSEL-DOE projector, considering aberrations and noise. Results of simulations are shown in FIG. 13 that shows three different selected gray patterns projected onto a simulated sphere that serves as an object, using 1200×1600 resolution projector and texture image. Therefore the simulation results confirm that the spatial pattern can be projected onto the 3D object.

Design and Computer Simulation of the DOE in the Projector:

Analytic model for intensity pattern created by a VCSEL array at the DOE plane was developed. Computer simulations for light propagation in free space from VCSEL to DOE and from DOE to spatial light pattern were conducted. For the free space simulation of light propagation, Fourier optics methods with numerical computing software codes (MATLAB and DiffractMod Rsoft) were used. Design of a DOE in the resonance domain that converts the VCSEL array light pattern into the structured light pattern onto the image plane was done. DOE design and simulations included possible aberrations of the incident beam and tolerance analysis.

Optimal Parameters of Basic Resonance Domain Diffraction Grating:

The DOE design started with searching for optimal resonance domain grating parameters that give maximum efficiency with lowest sensitivity to a change in the parameter. DOEs for VCSEL and Helium Neon (HeNe) laser were designed. The HeNe laser was used for reference due to its high coherence. A design and simulation tool for diffractive optics called DiffractMOD which is based on the Rigorous Coupled Wave Analysis (RCWA) technique was used.

FIGS. 14A1-2 and 14B1-2 show simulation results for the HeNe and VCSEL lasers with wavelengths of λ=632.8 nm, and λ=860 nm respectively. In both figures, diffraction efficiency as a function of AOI vs grating depth (left side), and period (right side) are shown for both wavelengths. The selected parameters were chosen to be $\Lambda_0$=0.61 µm, $\theta_B$=31.24, h=1.082 µm, and $\Lambda_0$=0.83 µm, $\theta_B$=31.2, h=1.474 µm for HeNe and VCSEL consecutively where $\theta_B$ is the Bragg angle, h is the etching depth, $\Lambda_0$ and is the periodicity of the DOE at its center.

Figure 15:
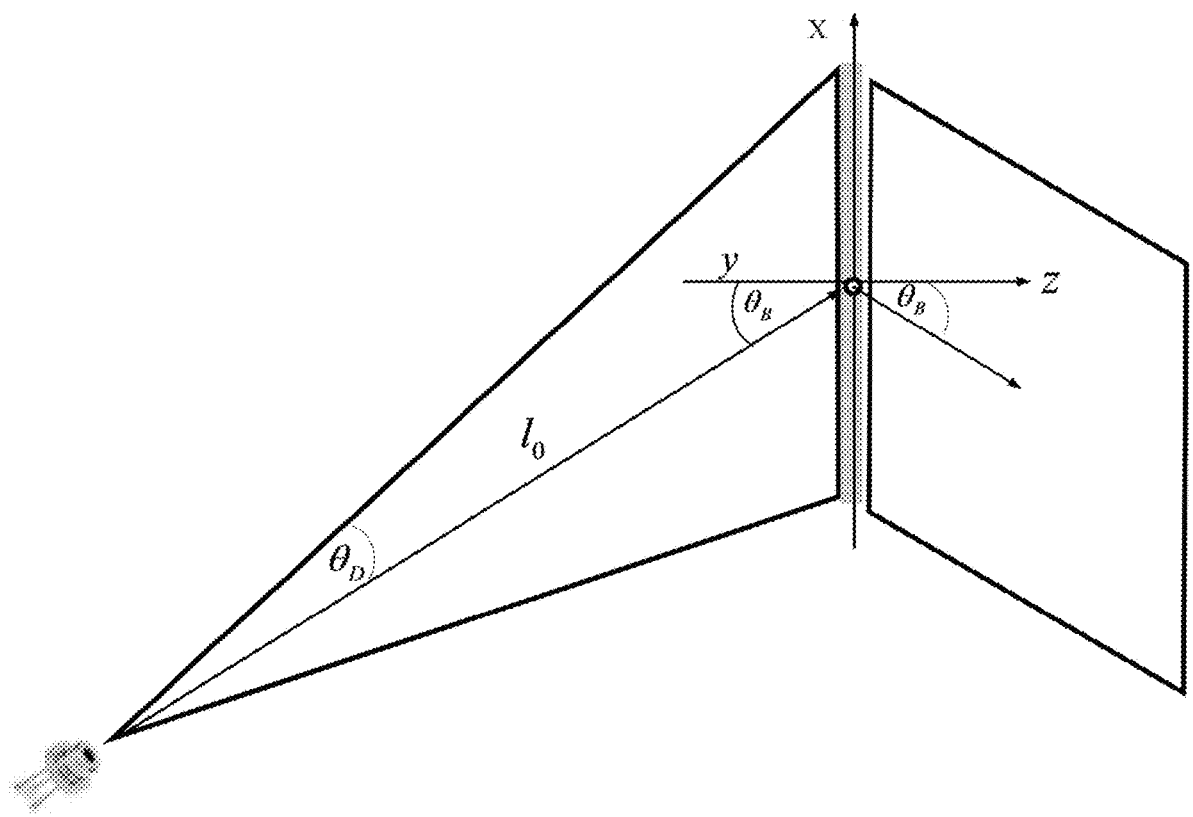
FIG. 15 shows schematically light emitted from a single VCSEL onto the DOE plane and then diffracted by the beam shaper.

Finding the Incident Phase onto the DOE:

As shown in FIG. 15, single VCSEL was treated as a single mode Gaussian beam with the divergence angle $\theta_D$ and its phase $\varphi_{inc}$ and amplitude $A_{inc}$ onto the DOE plane were calculated. Accordingly, the phase and amplitude after a propagation distance of $l_0$ and rotation of $\theta_B$ (the Bragg angle of incidence angle) are given by:

$$A_{inc}(u, v) \sim \exp\left[\frac{-u^2 \cos^2 \theta_B - v^2}{\theta_D^2((u \sin \theta_B + l_0)^2}\right],$$

$$\varphi_{inc}(u, v) = \frac{2\pi}{\lambda}\sqrt{l_0 + u^2 + v^2 + 2 \sin \theta_B l_0 u},$$

where u, v are Cartesian coordinates in the plane of the resonance domain top-hat beam shaper, which is tilted at angle $\theta_B$ to the plane of the shaped top-hat pattern.

Finding the Desired Output Phase of the Resonance Domain Tophat Beam Shaper DOE:

The phase after the resonance domain top-hat beam shaper is given by:

$$\varphi_{TopHat}(u,v) = k[\psi^{(x)}(u \cos \theta_B) + \psi^{(y)}(v) - \sqrt{l^2 + u^2 + v^2 + 2lu\sin\theta_B}],$$

where l is the distance to the top-hat plane, and $\psi^{(u)}$, $\psi^{(v)}$ are the partial top-hat eikonals. In one of the embodiments, the resonance domain top-hat beam shaper two-dimensional phase function is:

$$\varphi_{BeamShaper}(u, v) =$$
$$\varphi_{TopHat}(u, v) - \varphi_{inc}(u, v) = k\Big\{l_0 + l + \psi^{(x)}(u \cos \theta_B) + \psi^{(y)}(v) -$$
$$\sqrt{l^2 + u^2 + v^2 + 2lu \sin \theta_B} - \sqrt{l_0^2 + u^2 + v^2 + 2 \sin \theta_B u\, l_0}\Big\}$$

In another embodiment, the resonance domain top-hat beam shaper phase function contains term $\psi^{(x)}(u)\cos \theta_B$ in place of $\psi^{(x)}(u)$ wherein function $\psi^{(x)}(u)$ is configured accordingly to direct mapping of coordinates u at the beam shaper plane to coordinates at the output plane with the top-hat pattern, by considering the angle of incidence $\theta_B$.

In still another embodiment, the resonance domain top-hat beam shaper phase function is configured accordingly to direct mapping of coordinates u, v at the beam shaper plane to coordinates at the output plane with the top-hat intensity distribution by considering the 2D angle of incidence with components $\theta_{Bx}$ in direction of axis x and $\theta_{By}$ in direction of axis y.

Dimensions of DOE Aperture:

In order to conduct efficient e-beam lithography the DOE pattern was written only where the incidence Gaussian intensity was above $>\exp(-8)$. By solving equation:

$$I(u, v) \cdot \exp\left(-2\frac{u^2 \cos^2 \theta_B}{\tan^2 \theta_D(u \sin \theta_B + l_0)^2}\right) = \exp(-8)$$

Figure 16:
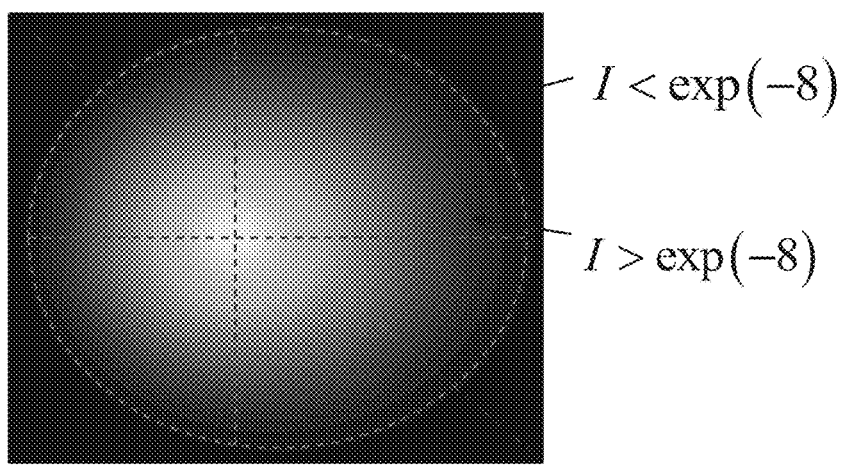
FIG. 16 shows the Gaussian intensity at the DOE plane.

It was found that the aperture is an ellipse (See FIG. 16), given by equation:

$$\left(\frac{u}{a}\right)^2 + \left(\frac{v}{b}\right)^2 = 1,$$

where $b = \tan \theta_D(u \sin \theta_B + l_0)$ $a = \tan \theta_D(u \sin \theta_B + l_0)/\cos \theta_D$ FIG. 16 shows the Gaussian intensity at DOE plane, where inside the dashed line the intensity is above $\exp(-8)$.

Multi TopHat Beam Shaper:

Multiple top-hat beam shaper with $N_{stripes}$ can be achieved by adding a phase of diffractive beam splitter $\varphi_{spl}(u)$ (spot array generator) to the phase of the sole top-hat beam shaper $\varphi(u)$ that was derived by map-transformation techniques.

$$\varphi_{mul}(u) = \varphi(u) + \varphi_{spl}(u), \; |u| \le A, \; |v| \le B, \; u = (u,v)$$

The phase of the beam splitter is a periodic function of one coordinate u, with period of $$P_{spl} = \begin{cases} \dfrac{\lambda l}{\Delta x}, & \text{odd number of tophats} \\ \dfrac{\lambda l}{0.5\, \Delta x} & \text{even number of tophats} \end{cases}$$

where $\Delta x$ is a distance between centers of adjacent tophats, l is a distance from the DOE to the output plane with multiple tophats. The phase of diffractive beam splitter can be calculated through a function $\varphi_1(\xi)$ of a dimensionless variable $0 \le \xi \le 1$ reduced to a single period with length 1.0, $$\xi = \frac{1}{P_{spl}}\mathrm{mod}(u, P_{spl}), \; \varphi_{spl}(u) = \varphi_1(\xi)$$

where $\mathrm{mod}(u, P_{spl})$ is a minimal non-negative residue of u after subtraction of multiples of $P_{spl}$. In case of odd number of stripes, $\varphi_1(\xi)$ is calculated directly as piecewise constant function with alternating values 0 and $\pi$. In case of even number of stripes, $\varphi_1(\xi)$ is calculated through another function $\varphi_{0.5}(\xi)$ defined on half of the interval $0 \le \xi \le 0.5$.

$$\varphi_1(\xi) = \begin{cases} \varphi_{0.5}(\xi), & 0 \le \xi \le 0.5 \\ \varphi_{0.5}(\xi) + \pi, & 0.5 < \xi \le 1 \end{cases}$$

The $\varphi_{0.5}(\xi)$ is piecewise constant function with alternating values 0 and $\pi$, as defined by coordinates in arrays provided below.

Computer Simulation of DOE Beam Shaper:

2D simulation of the DOE shaper was conducted to determine and verify its diffracted light at the image plane. FIGS. 17A-C show simulation results of top-hat with width of a=2 mm, and height b=1.3 mm for wavelength $\lambda$=860 nm and image plane distance from DOE of l=1000 mm. The 3D graph in FIG. 17A shows intensity distribution in the top-hat, the graphs in FIGS. 17B and 17C show cross section across and along the line. The latter graph reveals that the intensity distribution is indeed top-hat, as expected.

Figure 18A:
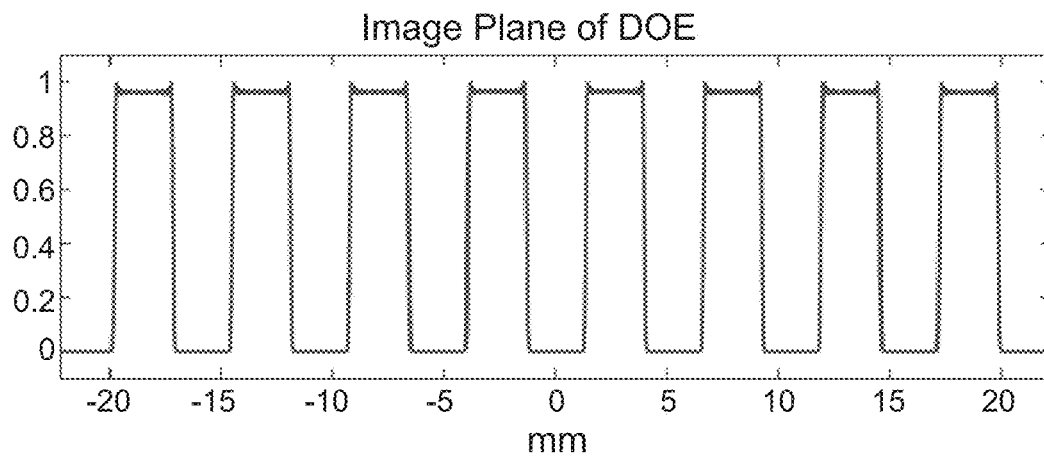
FIGS. 18A-C show simulation of light diffracted from the RDDOE beam shaper at image plane for FOV=10deg, with top-hat splitting of 8, 16 and 32 respectively.
Figure 18B:
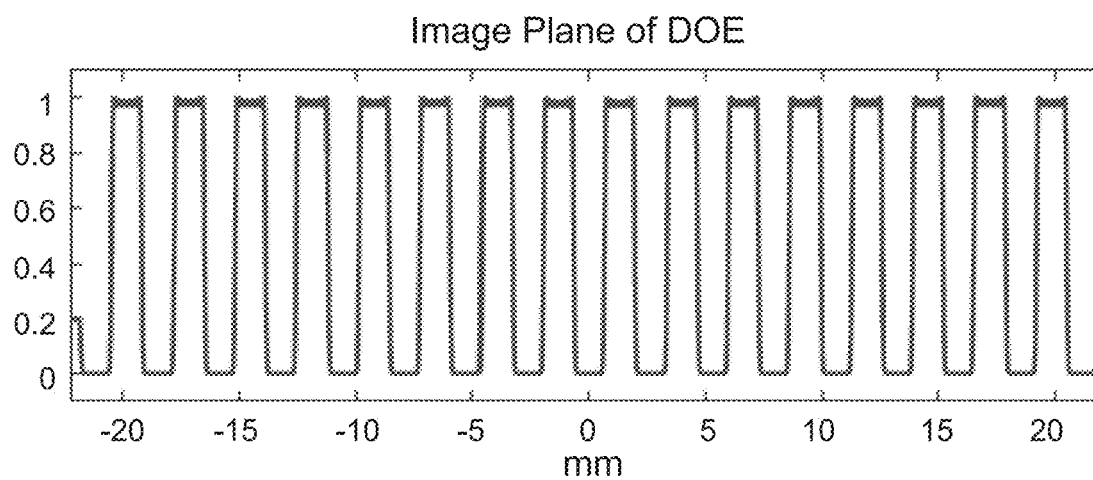
Figure 18C:
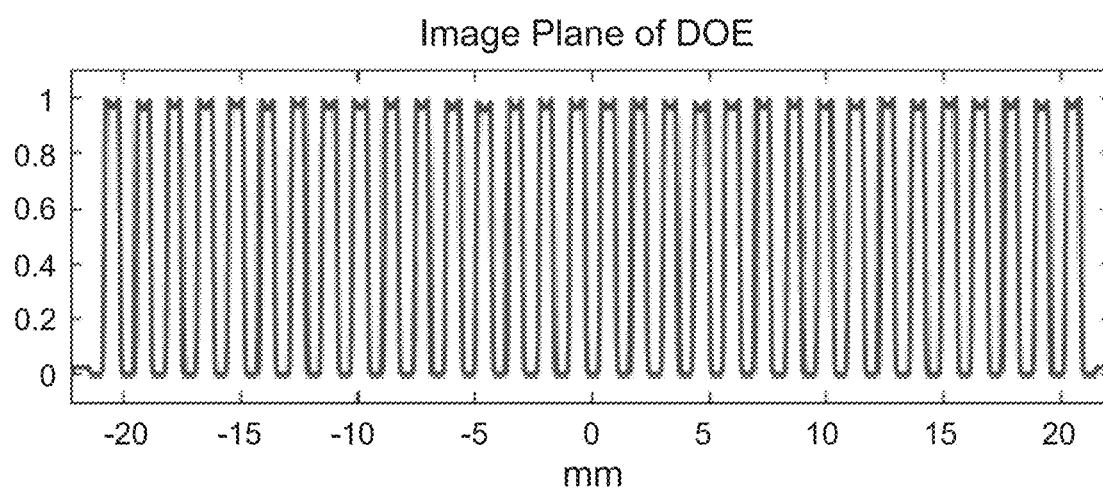

FIGS. 18A-C show simulation of diffracted light from a multi Top-Hat beam shaper, with top-hat splitting of 8 (FIG. 18A), 16 (FIG. 18B) and 32 (FIG. 18C), for FOV=10deg, l=120 mm, $\lambda$=632.8 nm.

Fabrication of the DOE:

The DOE design data was converted to industrial standard files for driving the electron beam (e-beam) lithography machines. The e-beam lithography process, with precision stitching of sub-fields in a large several square millimeters DOE area in e-beam resist layer, was conducted with sub-contractor. This process required thorough calibration of electron doses for proper features size and minimization of the stitching error. After the e-beam lithography, a stage of ion-beam milling of Chrome was carried out, to transfer the e-beam pattern into a metallic Chrome mask. Finally, reactive ion etching (RIE) into the Fused Silica (FS) substrate was done. Evaluating the fabrication process was done with the help of environmental scanning electron microscopy (ESEM). Several iterations in each process stage were conducted. Assembling of the optical set-up with sampled VCSELs was performed. Preliminary optical characterization of the DOEs in the optical set-up was done.

Creating GDSII Files Using MATLAB:

Matlab and the beam shaper smooth phase function were used to find the locations of the beam shaper isolones. The isoline equation was solved numerically.

$$\varphi_{BeamShaper}(u,v)=2\pi\cdot n$$

Each isoline point $(u_n,v_n)$ was converted to GDSII file to create the mask. FIG. 19A shows small area of $\varphi_{BeamShaper}$ where a selected contour line is plotted. FIG. 19B shows the entire DOE beam shaper layout file and FIG. 19C shows a magnified area of FIG. 19B.

DOE Fabrication:

The fabrication was done using the following procedure (a) recording a resonance domain grating pattern in e-beam resist layer with e-beam lithography, (b) transferring the recorded spatial pattern to a fine metal mask, and (c) transferring the spatial pattern from the metal mask to the substrate of the resonance domain grating using reactive ion etching technology (RIE). Finally, images of the DOE were taken with environmental scanning electron microscopy (ESEM). Specifically, the following main equipment was used: e-beam writers Raith EBPG 5200; AJA Ion Beam Milling ATC-2020-IM, Nextral (Unaxis) NE 860 machines, and Quanta 200 FEG (ESEM).

The substrate material was Fused Silica (FS) with dimensions: 18 mm×18 mm×0.42 mm Coating: 100 nm of Chrome deposited with e-beam evaporation. Resist: 400-300 nm of ZEP 520A, spin coated at 2000-4000 rpm for 1 minute and then baked under hot plate (with vacuum) at 180° C. for three minutes on top of the Chrome.

Figure 20B:
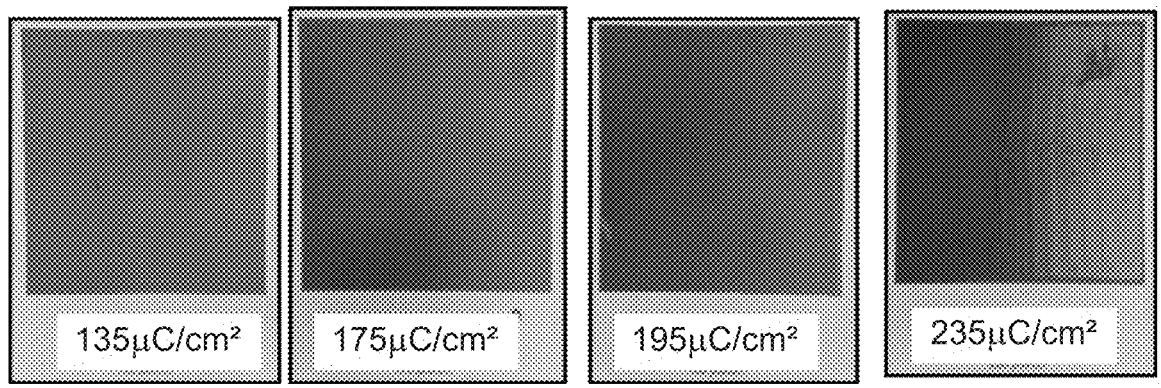

In the E-beam lithography, two different sets of parameters were tested, one with slower writing time and higher resolution, and the second with faster writing time and lower resolution. The e-beam lithography parameters and results are shown in FIGS. 20A-B.

For RIE, the gas mixture was $O_2$ (6 sccm), and $CHF_3$ (100 sccm). The plasma had the following parameters: pressure of 50 mtor and ICP generator frequency of 13.6 Mhz with a power of 400 W. Finally, substrate cooling was done with He (5 sccm).

Figure 21A:
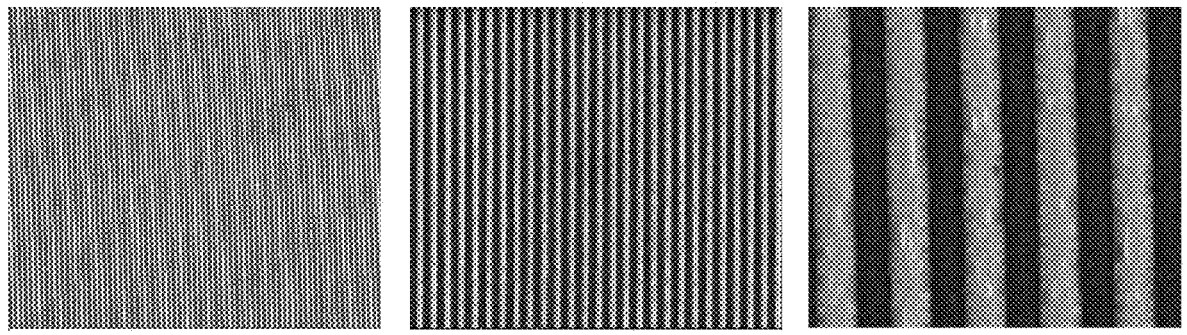
FIGS. 21A-B show different views of ESEM images of the RDDOE beam shaper with resist and FS cross section after etching.
Figure 21B:
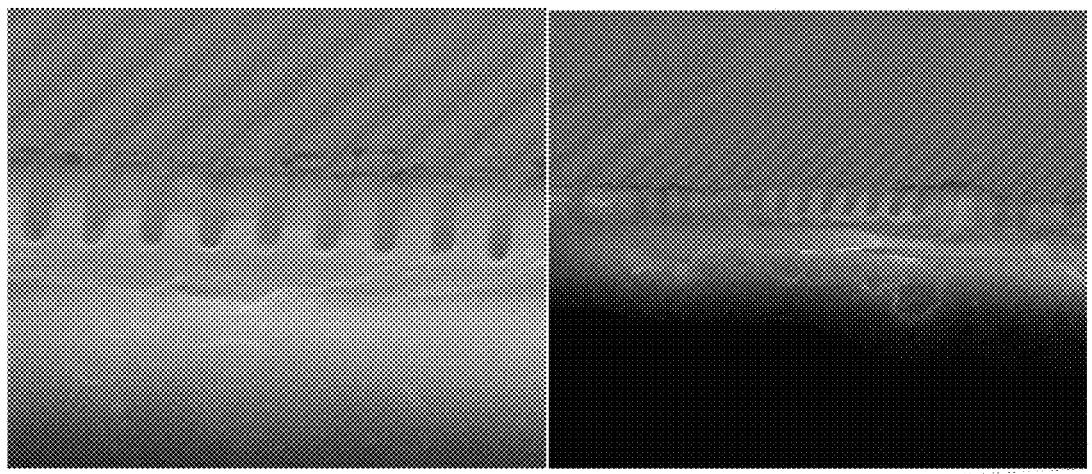

After e-beam lithography stage was completed, ESEM scanning was carried out to verify proper physical sizes of the gratings, and stitching error. After RIE into FS was completed, the substrate was cut for cross section ESEM inspection to verify proper etching depth. FIGS. 21A-B show respectively top images and cross section images of selected areas of the DOE beam shaper, after etching was done into the FS.

FIGS. 22A-D show surface relief profile of the SL DOE with N=64 stripes, wherein FIG. 22A shows plot of theoretical phase of the Dammann grating over half of a period, FIG. 22B shows top-view ESEM image, wherein inversions of the depth of the diffraction grooves are in match to the theoretical phase of the Dammann grating, FIG. 22C provides zoom-in of a region of image of FIG. 22B, and FIG. 22D shows mechanically cut cross section of a sample SL DOE.

Assembling and Optical Characterization of VCSEL Array

Integration of a single IAVA and single VCSELs with laser drivers and optimized laser driver for short pulse and high current for optical powers that are favorable for the VCSELs were considered. Optical investigation of a light field of the single IAVA and single VCSEL and measurements of the optical power have been conducted.

Multi-mode Single Emitter VCSEL:

The main technical characteristics of the laser HFE4091-341 are the following

1. The wavelength of the emitted light is $\lambda$=850 nm;
2. Radiation power P0=0.625 mW (at the current IF=7 mA);
3. Divergence of the beam $\Theta$'215° . . . 30 Pac;
4. Supply current IF=2.5 (threshold) . . . 12 mA (max during continuous operation);
5. The maximum reverse voltage VR=5V;
6. The temperature of the laser housing is not more than. T=85° C.;
7. Dimensions of the body Ø5.58×3.25 mm (TO-46).

Figure 23A:
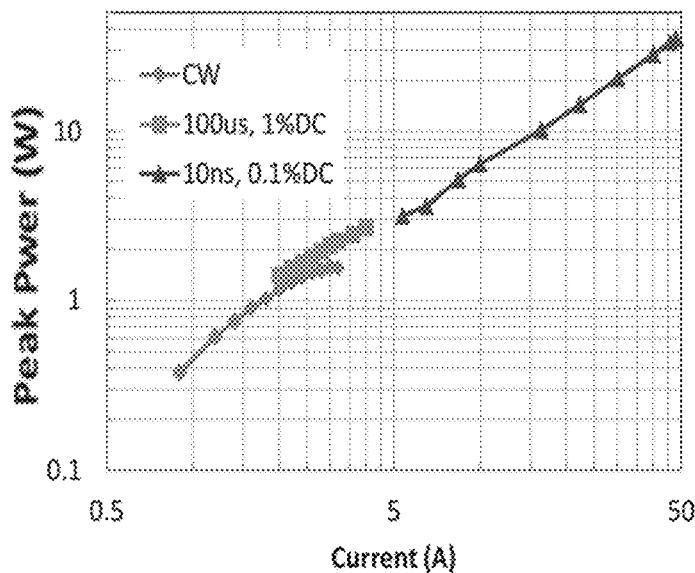
FIGS. 23A-B show a typical log-log plot of the peak optical power as a function of drive current for a VCSEL.
Figure 23B:
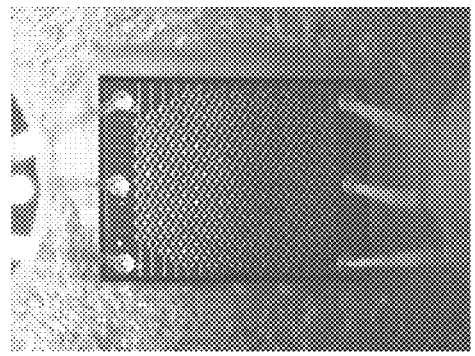

The main technical characteristics of the driver AIX-RBD for the VCSEL are:

1. Output current range IF=20 . . . 300 mA;
2. Supply voltage V=5 . . . 10 V;
3. Stability of the output current—better than 3%;
4. Dimensions: width—10 mm, length—20 mm, thickness—about 5 mm In order to design a DOE beam shaper specially tailored for VCSEL, a circuit for high current with very short pulses required for VCSEL operations was assembled. LDP-V 40-70 ultra-compact driver module from PicoLAS was used to drive 'HVS7000' high power VCSEL array from Finisar. The VCSEL array is capable of producing more than 10 Watts of optical power and requires ~10 ns pulse duration with a current of 10-50 A. FIG. 23A shows the array optical power vs the required current, where continuation of drive conditions is demonstrated. Both the optical power, on the Y-axis, and the drive current, on the X-axis are plotted on a log scale. The transient response of the VCSEL in the standard transistor outline (TO) package typically has a rise and fall times that can be made less than 1 ns. It is important to drive the VCSEL with a current limited waveform to insure that the laser is not damaged. The electrical resistance of the 2D array is significantly less than 1 Ohm, and the total capacitance will be less than a few pF when forward biased. The package inductance and capacitance typically dominate the pulse performance FIG. 23B shows the microscope image of the fabricated array.

Figure 24A:
FIGS. 24A-B show example for current and trigger pulse used with a VCSEL.
Figure 24B:
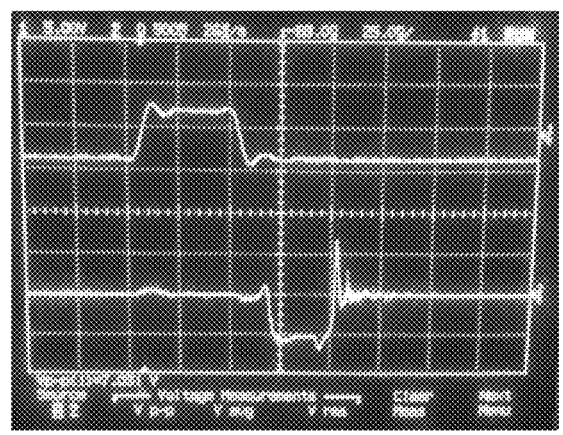

FIG. 24A shows the trigger signal given by the function generator, while FIG. 24B shows the VCSEL array current (down) and trigger pulse (up) as shown on an oscilloscope.

Optical Investigation of the DOE Under a Single VCSEL Array

Optical experimental investigation of the DOE under a single IAVA illumination, single VCSEL and reference He-Ne laser, was considered. Results of measurements of structured intensity patterns, image contrast, and light efficiency are provided herein below.

Figure 25:
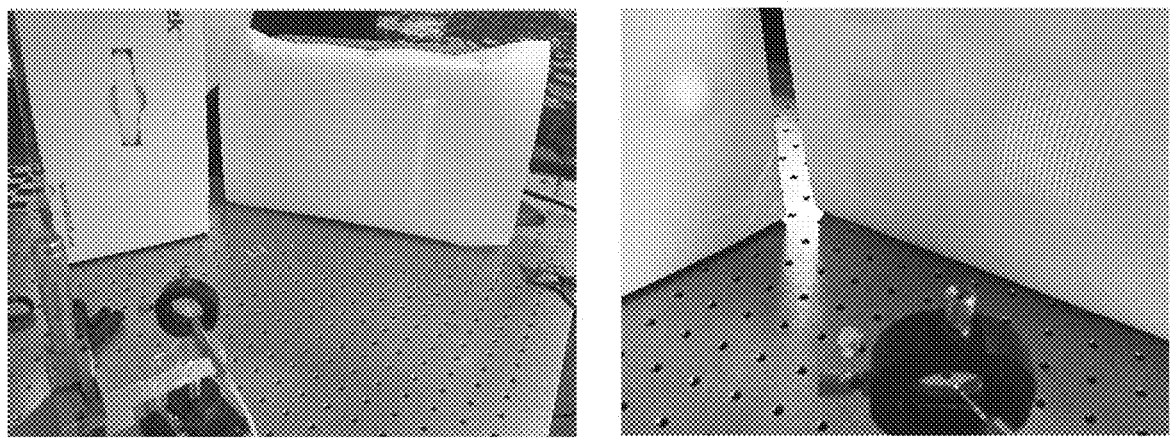
FIGS. 25 and 26 show an example of an optical setup of fiber coupled HeNe laser diffracted from a single top-hat beam shaper.

The first fabricated DOE beam shapers were for HeNe wavelength. This was done to verify correctness of the entire process due to the HeNe highly coherent nature. The HeNe laser was coupled to a single mode fiber to achieve high spatial coherence. FIG. 25 shows the optical setup of light emitting from a fiber coupled HeNe laser and diffracted from a single Tophat, beam splitting and Tophat shaper, with FOV of 10° and l=1 m and Tophat D8 with l=120 mm.

Figure 26:
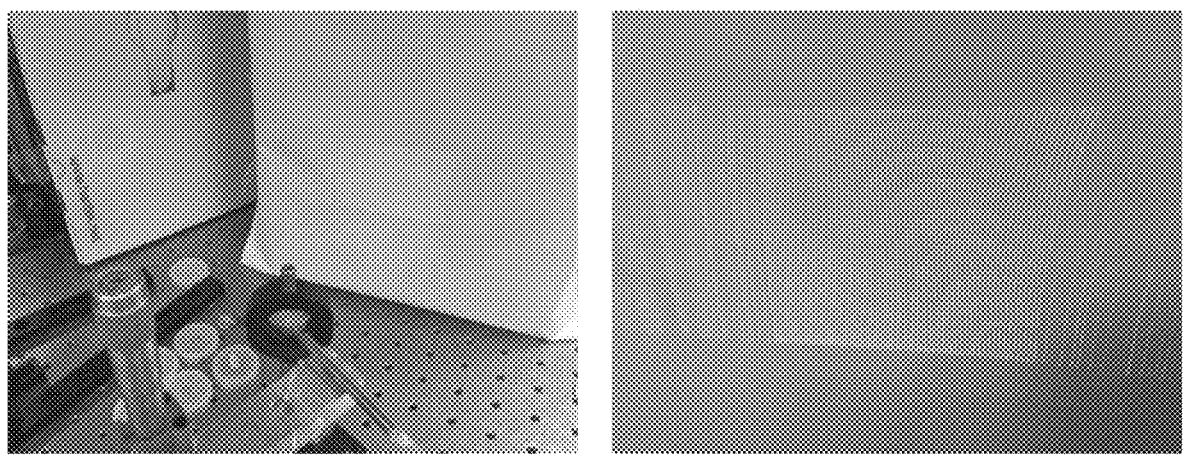

FIG. 26 shows the optical setup and image plane of HeNe fiber illuminating Top-Hat D64 with FOV of 10deg and l=120 mm For the optical characterization of SL DOEs, a pigtailed laser diode with wavelength of 642 nm (Thorlabs LP642-SF20) coupled to a polarization maintaining single mode fiber (SMF), a single emitter VCSEL (Finisar HFE4091) as light source, a power sensor (Thorlabs S120C), a focusing lens with focal length 30 mm and a square aperture with dimensions 25.4 mm×25.4 mm, were used.

Single emitter VCSEL (Finisar HFE4091) had a few mW power ~6 mW with current of 13 mA.

A camera for 860 nm was: DCC3240N (DE WH) High Sensitivity USB 3.0 CMOS Camera, 1280×1024, Global Shutter, NIR Sensor.

The DOE design parameters were:
l=1 meter, $l_0$=10 mm, $\Lambda_0$=0.83 µm, $\lambda$=0.860/0.642 µm, $\theta_B$=31.6, D=3 mm.
The target etch depth was . . . for $\lambda$=0.642 µm and . . . for $\lambda$=0.86 µm FIGS. 27-30 show the experimental structured light patterns that were reconstructed from DOEs with different numbers of the tophat stripes and common dimensions 352.7 mm×352.7 mm for the fanout angle of 20° at distance l=1 m both for 642 nm and 860 nm wavelengths. Some geometrical distortions that make the boundaries of the tophat stripes curved rather than straight lines can be explained by the use of the paraxial tophat shaper phase function $\varphi_{th,Far}$ in off-axis layout. Few local defects in the patterns, most notable in FIGS. 27(a) and 27(b), stem from some stitching errors and nonuniformity in EBL fabrication process of the DOEs.

Figure 27C:
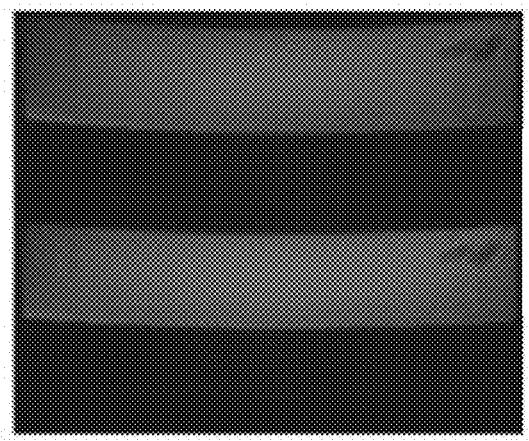
Figure 27B:
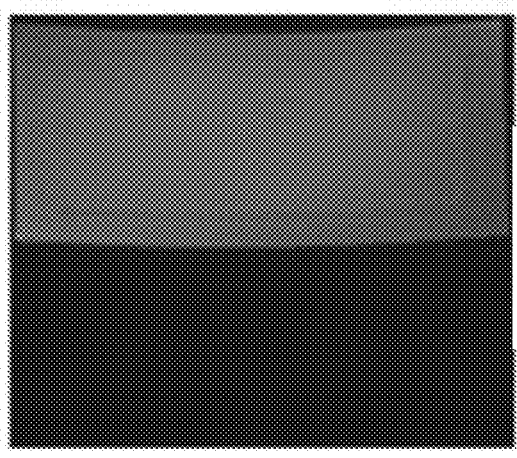
Figure 27A:
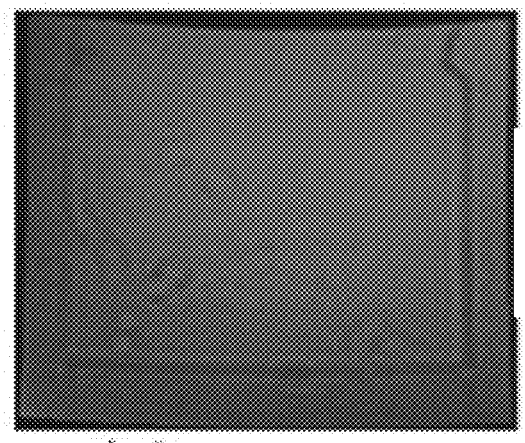
Figure 27F:
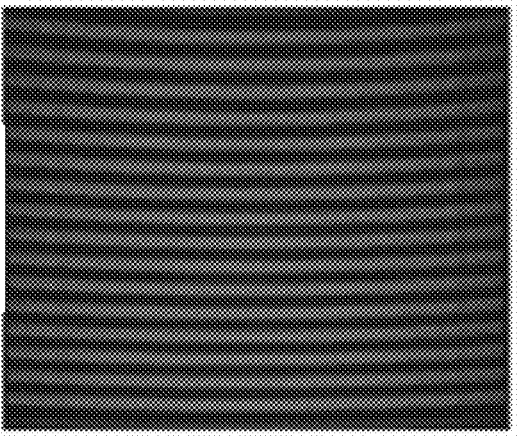
Figure 27E:
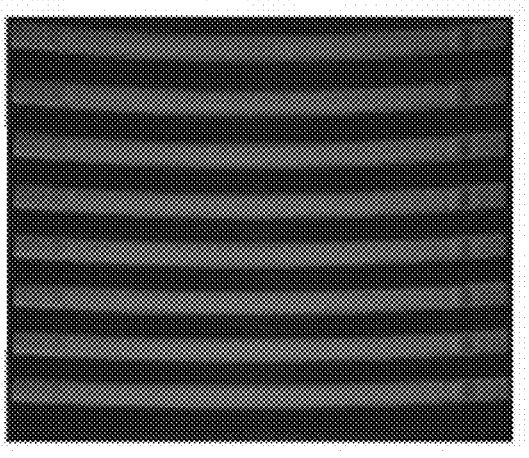
Figure 27D:
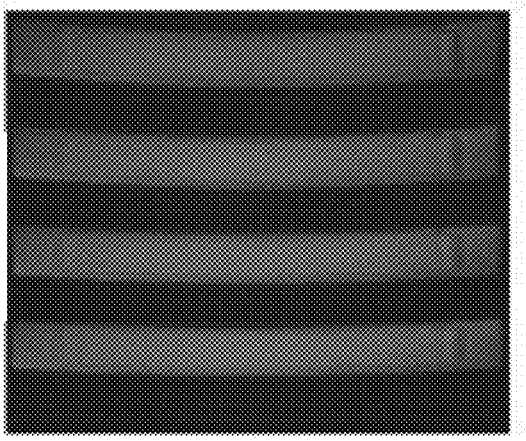

FIGS. 27A-F illustrate experimental structured light patterns (643 nm wavelength) with dimensions 352 mm×352 mm shot from a white screen at distance l=1 m, from DOEs with following numbers of stripes: FIG. 27A, N=0; FIG. 27B, N=1; FIG. 27C, N=2; FIG. 27D, N=4; FIG. 27E, N=8; FIG. 27F, N=16.

FIGS. 28A-K illustrate experimental structured light patterns (643 nm wavelength) with 32 and 64 tophat stripes, at distance l=1 m with dimensions 352 mm×352 mm FIGS. 28A and 28B are photos that were shot from a white screen; FIGS. 28C and 28G are local images of the patterns direct sensed by the CMOS camera, and FIGS. 28D and 28H are their 1-D cross section plots; FIGS. 28E, 28F, and 28I to 28K are magnified parts of FIGS. 28D and 28H. The dashed lines show theoretical results whereas the thick line is 200 points moving average.

FIG. 29 summarizes the results of the diffraction efficiency measurements. Some difference from the theoretical efficiencies can be explained by fabrication defects, which may be present in some parts of the DOE aperture.

Figure 30:
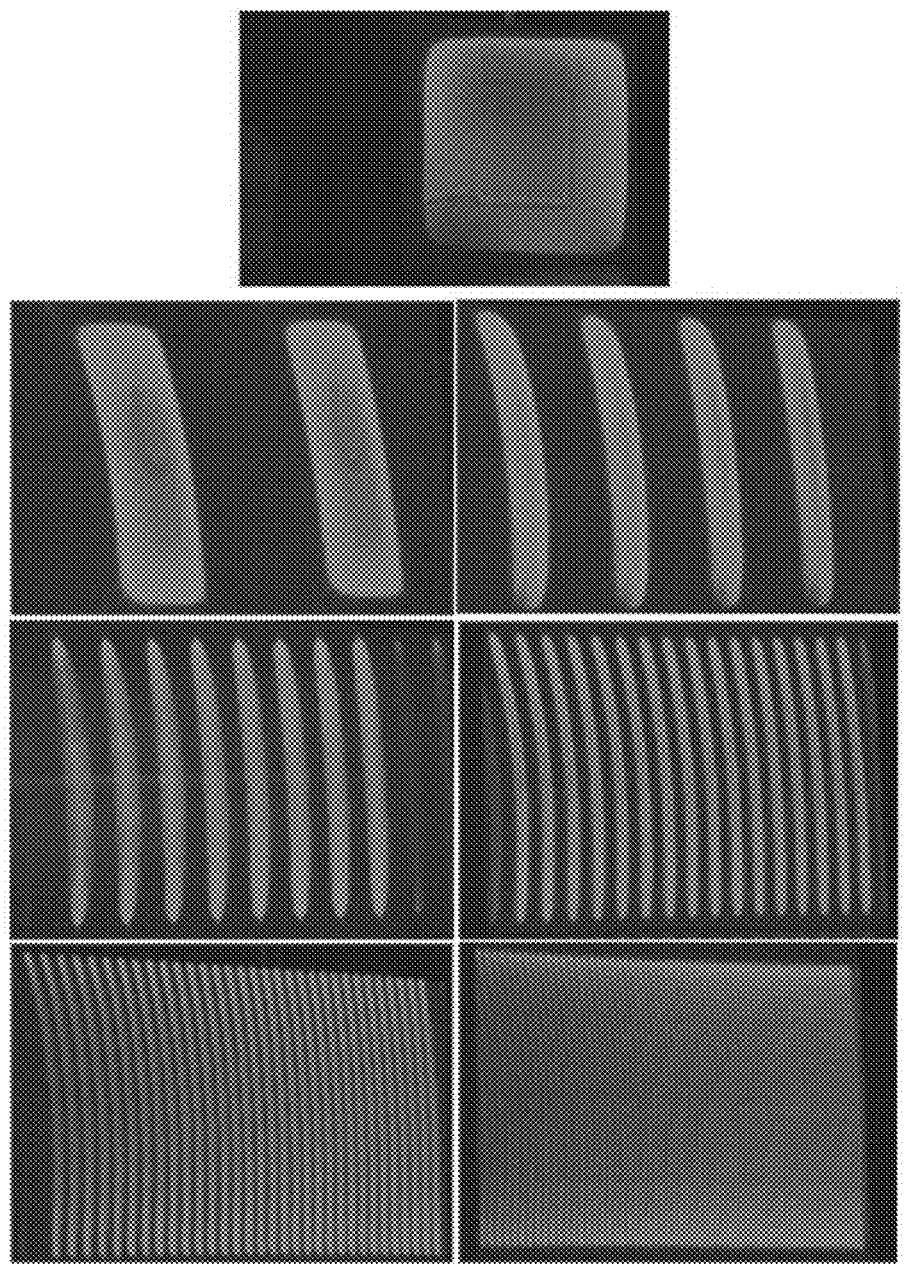

FIG. 30 illustrates experimental structured light patterns (860 nm wavelength) with respectively 1, 2, 4, 8, 16, 32, 64 stripes from single emitter multi-mode VCSEL, shot by IR CMOS camera from a white screen placed at distance l=1 m and have dimensions of 352 mm×352 mm;
l=1 meter, $l_0$=10 mm, $\Lambda_0$=0.83 µm, $\lambda$=0.86 µm, $\theta_B$=31.6, D=3 mm.

Figure 31:
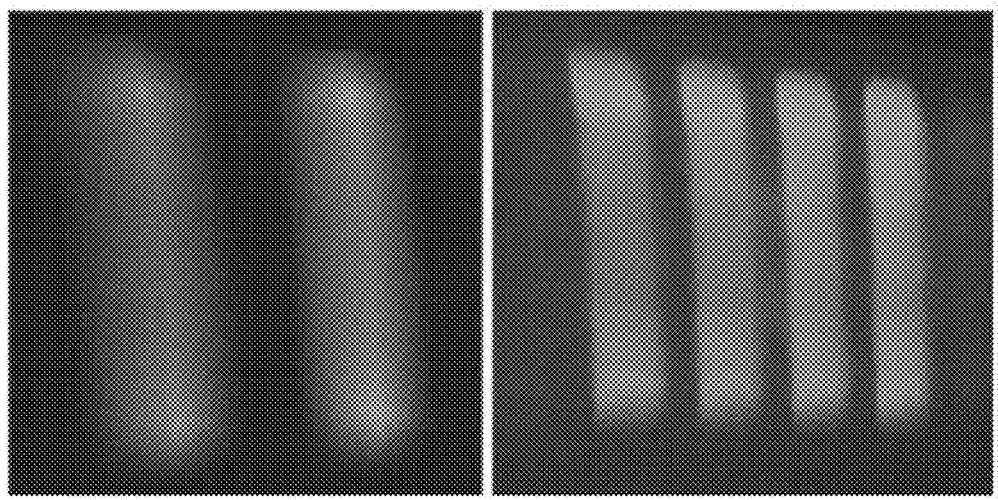
FIG. 31 shows experimental structured light patterns using array of multi-mode VCSELs.

In another experiment, VCSEL array was used as a light source and patterns that widened stripes, as expected, were obtained, as shown in FIG. 31. In FIG. 31, experimental structured light patterns (860 nm wavelength) with respectively 2 and 4 stripes from array of multi-mode VCSELs, shot by IR CMOS camera from a white screen placed at distance l=1 m and have dimensions 352 mm×352 mm, are shown. l=1 meter, $l_0$=10 mm, $\Lambda_0$=0.83 µm, $\lambda$=0.86 µm, $\theta_B$=31.6, D=3 mm.

Integration of VCSEL Arrays:

The inventors considered integration of lasers with DOEs, demonstration of the projector prototype, and projection of a time sequence of spatially structured patterns. The optical set-up, and optical experimental proof of the DOE and single VCSEL are described herein below.

Figure 32:
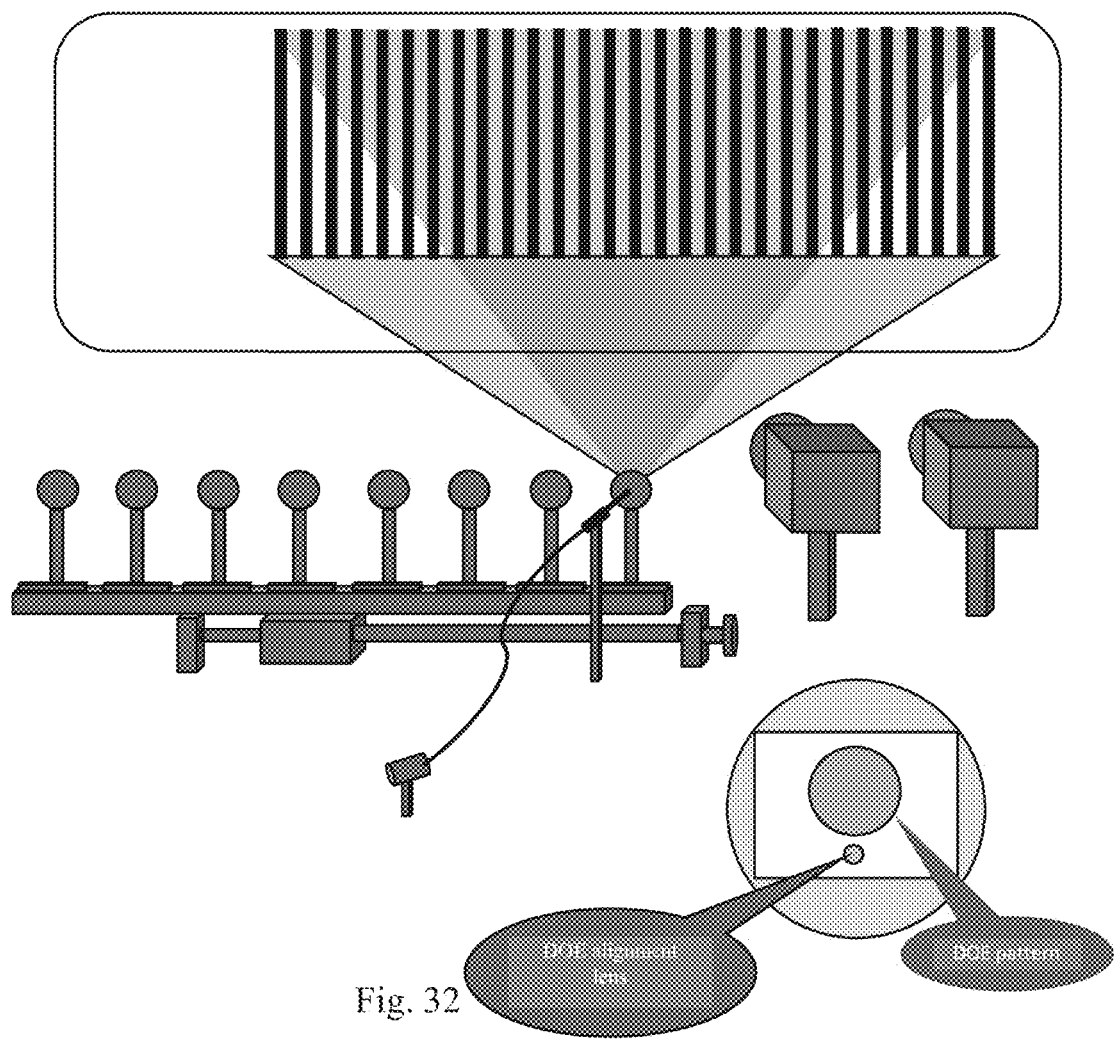
FIG. 32 shows optical arrangement for 3D sensing.

FIG. 32 illustrates an optical arrangement for 3D sensing. The exemplified optical arrangement includes projector and two cameras, multiple DOE projection patterns on a single axis lateral translation stage, lit by either a 642 nm laser diode or 860 nm VCSL array, with computer controlled laser drivers.

FIG. 33A-C illustrate experimental structured light patterns (860 nm wavelength) with 16 stripes on an object, at distance l=1 m with dimensions 352 mm×352 mm. FIG. 33A is a photo that was shot from a white screen by IR CMOS camera; FIG. 33B is a local image of the patterns direct sensed by the CMOS camera, and FIG. 33C is the 1-D cross section plots.

3D Surface Reconstruction:

The DOE projector that was built in accordance with the invention was using 642 nm laser diode as a power source. The object to be scanned is a 101 mm diameter ball bearing with 50 µm tolerances, at 1 m distance from setup.

Figure 34A:
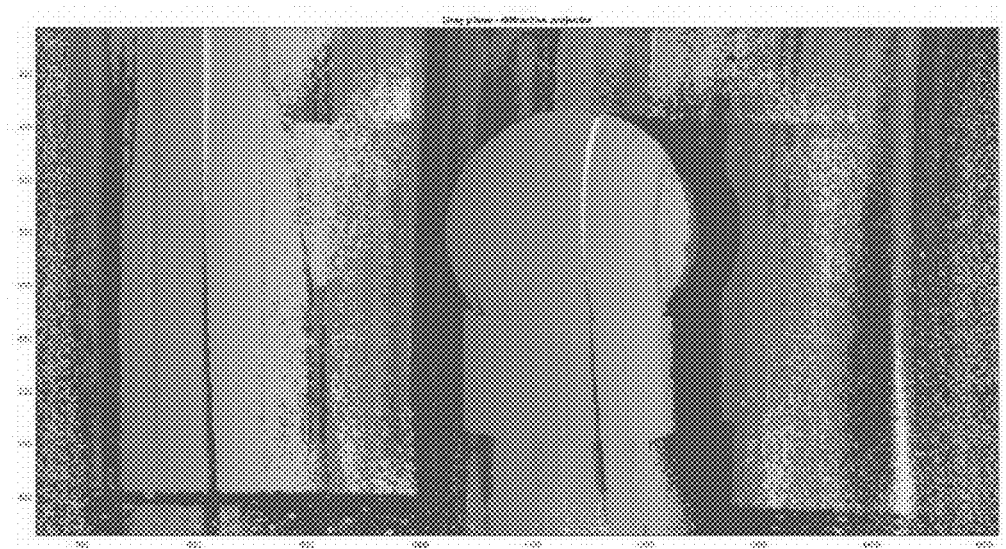
FIGS. 34A-B show reconstruction of a sphere using the 3D scanner of the invention.
Figure 34B:
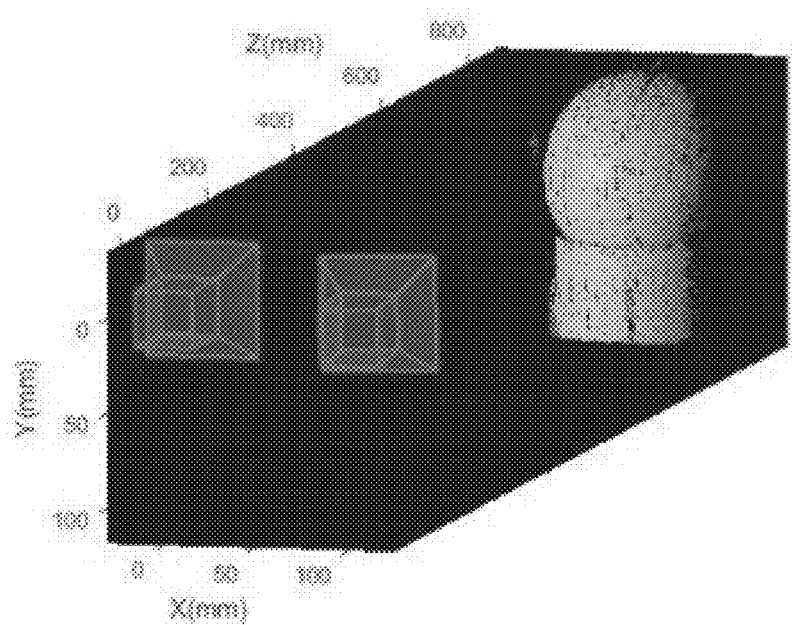

FIGS. 34A and 34B respectively illustrate the decoded structured light patterns using the DOE laser projector, and reconstructed sphere from camera 1 view, the camera is an RGB camera. In FIG. 34A, alignment issues are visible on the sphere, as well as artifacts resulting from aberrations on and around the sphere. The aforementioned issues result in visible loss of depth points, as can be seen in FIG. 34B.

In yet another experiment, a 3D scanner from off-the-shelf product (4000 Lumen projector and Aptina 10 Mp digital image camera) was built. The purpose of this scanner is for future reference. FIG. 35 shows the calibration process of the 3D scanner, and FIG. 36 shows the 3D reconstruction of a coffee cup using the 3D scanner built according to the present invention.

The invention claimed is:

1. A projector comprising an optical device configured and operable as a structured light generator to produce at least one structured light pattern, the optical device comprising a light source unit configured and operable to generate one or more light beams along predetermined one or more optical paths, and a diffractive optical unit accommodated in said one or more optical paths, at the output of said light source unit such that the diffractive optical unit faces the light source unit, the diffractive optical unit being non-periodic and two-dimensional (2D) and comprising at least one resonance-domain diffractive optical element (RD-DOE) configured to create 2D spatially variable pattern in a predetermined operative wavelength range, the diffractive optical unit being thereby configured and operable as a beam shaper for said one or more light beams to thereby create said at least one structured light pattern.

2. The projector of claim 1, wherein said light source unit comprises a single light source being configured and operable to generate said one or more light beams towards said diffractive optical unit.

3. The projector of claim 1, wherein said light source unit comprises an array of light sources being electrically configured to operate independently or simultaneously and being configured and operable to generate said one or more light beams towards said diffractive optical unit.

4. The projector of claim 3, wherein each of said light sources is aligned with a corresponding diffractive region of said diffractive optical unit.

5. The projector of claim 1, wherein said light source unit comprises one or more laser sources.

6. The projector of claim 5, wherein said one or more laser sources is(are) vertical-cavity surface-emitting laser source(s) (VCSEL(s)).

7. The projector of claim 1, comprising a control unit configured and operable to operate said optical device to successively perform multiple illumination sessions and produce a desired sequence of different structured light patterns, said control unit controls selection of one or more sets of one or more light sources in the light source unit to produce respective one or more of the light beams to create each of the different structured light patterns, and operates said selection of the sets of the light sources according to a predetermined time pattern to create said desired sequence of the different structured light patterns during a predetermined time interval.

8. The projector of claim 2, wherein said control unit comprises an actuator utility connectable to an operating utility of the structured light generator to simultaneously activate generation of a respective set of the light beams for the illumination session such that the light beams produced by said structured light generator during the illumination session intersect with corresponding locations on the RDDOE resulting in a desired structured light pattern.

9. The projector of claim 8, wherein each of the corresponding locations on the RDDOE creates a portion of each of the different structured light patterns, each of the different structured light patterns is split in one of the following: parts by boundaries extending parallel to a horizontal axis, parts by boundaries extending parallel to a vertical axis, parts by boundaries extending in both the horizontal axis and vertical axis (y), parts by straight boundaries extending in oblique directions or parts by curved boundaries in a plane that is lateral to propagation directions of the light beams, or sets of spots with random or deterministic locations.

10. The projector of claim 8, wherein each of the corresponding locations or regions on the RDDOE identically creates an entire structured light pattern, such that the desired structured light pattern at the projection plane is a superposition of several identical patterns created by a plurality of simultaneously activated locations or regions on the RDDOE.

11. The projector of claim 8, wherein each of the different structured light patterns have a different spatial frequencies of features of the patterns.

12. The projector of claim 1, wherein the structured light pattern comprises an array of spaced-apart light stripes or a set of spots with random or deterministic locations.

13. The projector of claim 1, wherein said RDDOE has an array of patterned regions, each such array of patterned regions being optically aligned with a respective sub-array of array of light sources of the structured light generator.

14. The projector of claim 13, wherein a structured light pattern produced by a pair of the optically aligned light source and the patterned region of the RDDOE has a rectangular shape.

15. The projector of claim 1, configured and operable to produce the structured light pattern having a fan angle of light projection onto a projection plane, where the object is located, the fan angle being larger than 20 degrees.

16. The projector of claim 11, wherein said at least one spatial frequency of the features of the patterns is at least 3 cycles per degree.

17. The projector of claim 1, wherein said light beam has a Gaussian intensity distribution profile and said beam shaper is configured and operable to convert said Gaussian profile into a single or multiple top-hat profile(s).

18. A method for use in 3D imaging of an object, the method comprising: projecting two-dimensional (2D) spatially varying structured light patterns comprising sub-patterns and primitive shapes onto the object and extracting a 3D image data indicative of the object utilizing said projected structured light patterns, wherein said projecting comprises a sequence of projections including projections of different structured light patterns successively projected onto the object according to a predetermined time pattern, said image data of the object illuminated by the different structured light patterns thereby comprising a sequence of image data pieces including the data pieces corresponding to the different structured light patterns, thereby enabling processing of said image data to reconstruct a 3D image of the object.

19. The method of claim 17, wherein each of the different structured light patterns is split in one of the following configurations: parts by boundaries extending parallel to a horizontal axis, parts by boundaries extending parallel to a vertical axis, parts by boundaries extending in both the horizontal axis and vertical axis (y), parts by straight boundaries extending in oblique directions or curved boundaries in a plane that is lateral to propagation directions of the light beams, or sets of spots with random or deterministic locations.

20. The method of claim 17, wherein number of the different structured light patterns projected onto the object is determined based on ongoing processing of the image data pieces, such that each object is reconstructed using a specific number of different structured light patterns.

* * * * *